(12) United States Patent
Melamed et al.

(10) Patent No.: US 10,915,099 B1
(45) Date of Patent: Feb. 9, 2021

(54) SYSTEM AND METHOD FOR DETECTING AND DEFEATING A DRONE

(71) Applicant: CELLANTENNA INTERNATIONAL INC., Coral Springs, FL (US)

(72) Inventors: Howard Melamed, Coral Springs, FL (US); Stevan Melamed, Boca Raton, FL (US); Chris Svanberg, Coral Springs, FL (US); Matias Ponce, Coral Springs, FL (US); Michael Horvat, Coconut Creek, FL (US)

(73) Assignee: CELLANTENNA INTERNATIONAL INC., Coral Springs, FL (US)

( * ) Notice: Subject to any disclaimer, the term of this patent is extended or adjusted under 35 U.S.C. 154(b) by 0 days.

(21) Appl. No.: 16/357,602

(22) Filed: Mar. 19, 2019

Related U.S. Application Data

(63) Continuation of application No. 15/389,562, filed on Dec. 23, 2016, now Pat. No. 10,234,857, which is a continuation of application No. 14/693,280, filed on Apr. 22, 2015, now Pat. No. 9,529,360.

(60) Provisional application No. 62/108,595, filed on Jan. 28, 2015.

(51) Int. Cl.
*G05D 1/00* (2006.01)
*H04K 3/00* (2006.01)
*F41H 13/00* (2006.01)
*B64C 39/02* (2006.01)
*G01S 3/02* (2006.01)
*G01S 3/46* (2006.01)

(52) U.S. Cl.
CPC ......... *G05D 1/0022* (2013.01); *B64C 39/024* (2013.01); *F41H 13/0093* (2013.01); *G01S 3/023* (2013.01); *G01S 3/46* (2013.01); *H04K 3/45* (2013.01); *H04K 3/46* (2013.01); *H04K 3/60* (2013.01); *H04K 3/65* (2013.01); *H04K 3/92* (2013.01); *B64C 2201/146* (2013.01); *H04K 3/42* (2013.01); *H04K 3/44* (2013.01); *H04K 2203/14* (2013.01); *H04K 2203/22* (2013.01); *H04K 2203/32* (2013.01)

(58) Field of Classification Search
CPC .................................................... G05D 1/0022
See application file for complete search history.

(56) References Cited

U.S. PATENT DOCUMENTS

| | | |
|---|---|---|
| 4,016,565 A | 4/1977 | Walker |
| 4,468,656 A | 8/1984 | Clifford |
| 4,723,311 A | 2/1988 | Moustakas et al. |
| (Continued) | | |

*Primary Examiner* — Michael A Berns
(74) *Attorney, Agent, or Firm* — Malloy & Malloy, PL; Peter Matos

(57) ABSTRACT

A system for detecting and defeating a drone is disclosed which includes a detection antenna array configured to detect the drone and a control signal of the drone in a 360 degree field, the detection antenna array being further configured to detect the directionality of the drone with reference to the most dominant of the control signal of the drone detected by each of a plurality of antennas within the detection antenna array; a neutralization system disposed in communication with the detection antenna array; the neutralization system including a transmission antenna configured to transmit an override signal to the detected drone, an amplifier configured to modulate a gain of the override signal, and a processing device configured to generate the override signal and control transmission of the override signal.

18 Claims, 5 Drawing Sheets

(56) References Cited

U.S. PATENT DOCUMENTS

| | | | | |
|---|---|---|---|---|
| 4,727,537 | A | 2/1988 | Nichols | |
| 4,825,435 | A | 4/1989 | Amundsen et al. | |
| 4,990,814 | A | 2/1991 | Tanski et al. | |
| 5,442,168 | A | 8/1995 | Gurner et al. | |
| 5,568,476 | A | 10/1996 | Sherer et al. | |
| 5,881,105 | A * | 3/1999 | Balachandran | H04B 7/18558 370/498 |
| 5,884,040 | A | 3/1999 | Chung | |
| 5,930,696 | A | 7/1999 | Tzuang | |
| 5,966,646 | A | 10/1999 | Lampe et al. | |
| 6,442,168 | B1 | 8/2002 | Vasa | |
| 6,683,567 | B2 * | 1/2004 | De Champlain | G01S 3/18 342/385 |
| 6,774,845 | B2 * | 8/2004 | De Champlain | G01S 3/18 342/374 |
| 6,868,314 | B1 | 3/2005 | Frink | |
| 6,992,614 | B1 | 1/2006 | Joyce | |
| 7,206,569 | B2 * | 4/2007 | Erskine | H04W 4/029 455/405 |
| 7,218,912 | B2 * | 5/2007 | Erskine | H04W 4/029 455/405 |
| 7,224,750 | B2 * | 5/2007 | Kim | H03D 7/163 375/316 |
| 7,236,766 | B2 | 6/2007 | Freeburg | |
| 7,283,840 | B2 | 10/2007 | Cho | |
| 7,330,500 | B2 * | 2/2008 | Kouki | H04B 1/525 370/276 |
| 7,336,939 | B2 | 2/2008 | Gomez | |
| 7,339,981 | B2 | 3/2008 | Dogan | |
| 7,403,773 | B2 * | 7/2008 | Kappes | H04L 12/2856 455/432.1 |
| 7,593,706 | B2 | 9/2009 | Bucknor et al. | |
| 7,668,505 | B2 | 2/2010 | Vacanti | |
| 7,683,782 | B2 | 3/2010 | Christopher | |
| 7,696,919 | B2 * | 4/2010 | Moraites | F41G 3/147 342/107 |
| 7,746,052 | B2 * | 6/2010 | Noujeim | G01R 23/16 324/76.19 |
| 7,853,261 | B1 | 12/2010 | Lewis et al. | |
| 8,060,009 | B2 * | 11/2011 | Gainey | H04B 7/15542 455/15 |
| 8,164,440 | B2 | 4/2012 | Lontka | |
| 8,169,369 | B2 * | 5/2012 | Gonzalez | G01S 11/02 342/386 |
| 8,204,494 | B2 | 6/2012 | Weinzierl | |
| 8,305,196 | B2 | 11/2012 | Kennedy et al. | |
| 8,483,703 | B2 | 7/2013 | Swope et al. | |
| 8,543,053 | B1 | 9/2013 | Melamed et al. | |
| 8,655,348 | B2 | 2/2014 | Zha | |
| 8,750,903 | B1 | 6/2014 | Fitzsimmons et al. | |
| 8,761,687 | B2 | 6/2014 | Chang et al. | |
| 8,798,922 | B2 | 8/2014 | Tillotson | |
| 8,824,966 | B2 | 9/2014 | Boes | |
| 8,903,304 | B2 * | 12/2014 | Coleman | H04K 3/45 455/1 |
| 8,955,110 | B1 | 2/2015 | Twitchell | |
| 9,048,944 | B2 | 6/2015 | Boes | |
| 9,059,782 | B2 * | 6/2015 | Desai | H04B 1/406 |
| 9,204,488 | B2 | 12/2015 | Bai | |
| 9,246,629 | B2 | 1/2016 | Coleman | |
| 9,288,751 | B2 * | 3/2016 | Finkelstein | H04W 48/20 |
| 9,529,360 | B1 | 12/2016 | Melamed | |
| 9,572,176 | B2 * | 2/2017 | Desai | H04B 1/406 |
| 9,797,978 | B1 | 10/2017 | Melamed | |
| 9,847,035 | B1 | 12/2017 | Melamed | |
| 10,234,857 | B1 * | 3/2019 | Melamed | G01S 3/46 |
| 10,374,732 | B1 | 8/2019 | Melamed | |
| 2001/0033600 | A1 | 10/2001 | Yang et al. | |
| 2003/0174763 | A1 | 9/2003 | Kouki | |
| 2004/0057537 | A1 | 3/2004 | Kim | |
| 2004/0130488 | A1 | 7/2004 | De Champlain | |
| 2004/0166878 | A1 | 8/2004 | Erskine et al. | |
| 2004/0203748 | A1 | 10/2004 | Kappes et al. | |
| 2005/0040909 | A1 | 2/2005 | Waight | |
| 2005/0108374 | A1 | 5/2005 | Pierzga | |
| 2006/0063485 | A1 | 3/2006 | Gainey et al. | |
| 2006/0188033 | A1 | 8/2006 | Zehavi et al. | |
| 2007/0060055 | A1 | 5/2007 | Desai | |
| 2007/0099667 | A1 | 5/2007 | Graham et al. | |
| 2007/0285280 | A1 | 12/2007 | Robinson et al. | |
| 2009/0061870 | A1 | 3/2009 | Finkelstein et al. | |
| 2009/0098847 | A1 | 4/2009 | Noujeim | |
| 2009/0174589 | A1 | 7/2009 | Moraites | |
| 2010/0150209 | A1 | 6/2010 | Gonzalez | |
| 2010/0272012 | A1 | 10/2010 | Knefelkamp | |
| 2011/0002687 | A1 | 1/2011 | Sabat, Jr. et al. | |
| 2011/0117870 | A1 | 5/2011 | Pera | |
| 2012/0057566 | A1 | 3/2012 | Ahmadi | |
| 2012/0235881 | A1 | 9/2012 | Pan | |
| 2012/0299765 | A1 | 11/2012 | Huang et al. | |
| 2012/0309288 | A1 | 12/2012 | Lu | |
| 2012/0322459 | A1 | 12/2012 | Jaffri et al. | |
| 2013/0099975 | A1 | 4/2013 | Cyganski et al. | |
| 2013/0244712 | A1 | 9/2013 | Kuzio et al. | |
| 2013/0316659 | A1 | 11/2013 | Ylamurto | |
| 2014/0253378 | A1 * | 9/2014 | Hinman | H04B 7/0452 342/361 |
| 2014/0269650 | A1 | 9/2014 | Sahota | |
| 2014/0277854 | A1 | 9/2014 | Jones | |
| 2014/0344927 | A1 * | 11/2014 | Turgeman | H04W 12/06 726/22 |
| 2015/0133067 | A1 | 5/2015 | Chang et al. | |
| 2015/0214926 | A1 | 7/2015 | Tohidian et al. | |
| 2015/0226834 | A1 | 8/2015 | Floch | |
| 2015/0278140 | A1 | 10/2015 | Motos | |
| 2015/0304783 | A1 | 10/2015 | Haubrich et al. | |
| 2015/0304869 | A1 | 10/2015 | Johnson | |
| 2015/0312835 | A1 | 10/2015 | Subramanian | |
| 2015/0370250 | A1 | 12/2015 | Bachrach | |
| 2016/0274229 | A1 | 9/2016 | Oh | |

* cited by examiner

SYSTEM AND METHOD FOR DETECTING AND DEFEATING A DRONE

CLAIM OF PRIORITY

The present application is a Continuation application which claims priority to U.S. Ser. No. 15/389,562, filed on Dec. 23, 2016, which is set to mature into U.S. Pat. No. 10,234,857 on Mar. 19, 2019, which itself is a continuation of U.S. Ser. No. 14/693,280, filed on Apr. 22, 2015 and which matured into U.S. Pat. No. 9,529,360 on Dec. 27, 2016, which is based on and a claim of priority is made under 35 U.S.C. Section 119(e) to a provisional patent application in the U.S. Patent and Trademark Office, namely, that having Ser. No. 62/108,595 and a filing date of Jan. 28, 2015, all of which is explicitly incorporated herein by reference.

BACKGROUND OF THE INVENTION

Field of the Invention

This invention generally relates to systems and methods of detecting and defeating a drone. More specifically, a drone within the range of a detection antenna array is detected, its control signal is captured, and a neutralization system then emits an override signal based on the captured control signal.

Description of Related Art

The use of drones besides the United States military has increased exponentially in the recent years. In fact, the Federal Aviation Administration ("FAA") expects that by year 2020, American skies will have up to 30,000 drones operating domestically, fueling a $90 billion dollar industry. So, the possibility of a remote controlled, robot-crowded sky in the near future is very probable. Drones, as some of the unmanned aerial vehicles are popularly known, are becoming mainstream. This is because they can easily traverse places, where sometimes humans cannot. For instance, non-military drones have many advantages—crop dusting, high wire inspection, weather monitoring, firefighting, search and rescue missions, food and commodity delivery system, and border security, disaster responses, ground surveillance mechanism for law enforcement authorities, checkpoint operations in border patrols, crime prevention in urban areas, including but not limited to other law enforcement and military encounters in perilous state of affairs. Additionally, drones are also being developed for detecting explosives and disabling explosive activated vehicles. For instance, military, EOD (Explosive Ordnance Disposal), HazMat (Hazardous Materials), SWAT (Special Weapons and Tactics), law enforcement agencies and other first responders now rely on drones to help assure a safe, successful outcome for their most challenging missions.

The increasing trend of drone usage has its pro and cons. As such, what is highly concerning is that the operation of drones, including personal drones is currently unregulated. This means that how, when and where drones can be operated is currently under no regulation by the FAA. Because of this, private entities and public law enforcement authorities other than the military, have the utmost freedom to use drones as they seem fit. So for instance, personal drones controlled by individuals can be flown within close proximities of buildings, edifices, residences, and airports with reckless disregard.

Statistics indicate that drones, when unregulated by the FAA, have a significantly higher propensity to be involved in accidents. Primarily, this is supported by the fact that accidents like crashes into buildings and residences, dive downs on public sidewalks and property, and mid-air collisions have exponentially increased in recent years. Furthermore, studies reveal that 418 drone related crashes have occurred since 2001. Consequently, victims of drone crashes have been unsuccessful in detecting and defeating drones in efforts to protect themselves or their properties out of harm's way.

However, drone related causalities can be prevented, if an adequate drone detection and defeat system is made available. Therefore, it is imperative that the market be provided with a system and method for detecting and defeating a drone, primarily aimed at protecting persons and property out of harm's way in drone related encounters.

In a recent poll taken, 47 percent of Americans said they were very concerned about drones "killing or harming innocent civilians." Another 37 percent said they were "somewhat concerned." 66 percent said they were concerned "that there is not enough oversight" of drone strikes, and 50 percent said they were concerned that the strikes were "damaging the image of the United States." Given this pessimistic attitude on drone related activities what is startling is that even when regulated as in the case of military drones, there have been unprecedented drone related mishaps. For instance, statistics indicate that drones operated and regulated by the military are increasingly colliding with homes, farms, runways, roads, waterways and even in mid-air with smaller airplanes flying at lower altitudes despite their sophisticated technology.

Clearly, safety seems to be one of the primary concerns when it comes to drones. The fact that more and more drones are set to become a common fixture in American civilian life within a few years is concerning from a safety perspective, regardless of whether it is military regulated or personally operated. Therefore, it is imperative that the market be provided with a system and method for detecting and defeating a drone, aimed at increasing the safety of persons and property from potentially imminent drone related encounters.

Furthermore, the other primary concerns are protecting individual privacy. This is because there are no regulations enacted by the FAA related to spying and surveillance capabilities of drones. Accordingly, this has increased people's paranoia—concerning them greatly about their privacy. Similarly, commercially operated drones have raised several privacy concerns amongst private citizens. This is because most drones today are well-equipped with state of the art, high resolution cameras and recorders. As such, cameras and video recorders installed on drones have the potential to invade into people's personal lives, capturing them anytime through its lens like some unsolicited prying eyes in the sky. Consequently, drones equipped with cameras and video recorders can be easily configured to instantaneously capture high definition pictures and videos of practically anyone or anything within its flight path. As such, the captured images and videos can not only be viewed instantly with unprecedented clarity, but also uploaded on to any social media site within minutes. As a result, drone operators have the utmost freedom to fly their drones over private property, view and record anyone and anything and upload them on the Internet to be viewed by everyone.

Furthermore, drones can be used in illegal activities like smuggling drugs, blackmailing people with recorded images, having means to carry and drop explosives, shoot bullets from installed guns, and gather personal information on anyone. Clearly, this intrusive nature of prying eyes and potential to increase violence and illegal activities via drones is highly concerning. Therefore, a system and method to detect and defeat drones with the aim of increasing safety, protecting privacy and decreasing potentially illegal activities is required.

Therefore, it may be imperative that the world is in need of a system and method for detecting and defeating a drone system that thwarts and captures drones in a way that is non-offensive, non-combative, and non-destructive.

SUMMARY OF THE INVENTION

The invention is intended to present a solution to these and other needs which remain in the relevant field of art. As such, and for purposes of clarity in describing the structural and operative features in at least one preferred embodiment, the present invention is directed to a system and method for detecting and defeating a drone. The system generally includes a detection antenna array. Accordingly, the detection antenna array can include a set of two or more antennas installed in various geometric arrays. Alternatively, however, the detection antenna array can include any preferred number of antennas depending on various factors pertaining to detecting and defeating the drone. Given this, various kinds of direction-finding array systems can be used as the detection antenna array in the system.

In one of the preferred embodiments, the detection antenna array can include a set of four 90-degree sector antennas. The sector antennas are structured and configured to create a powerful antenna array station. The versatile combination of the sector antennas allows unparalleled flexibility and convenience, while using them to detect drones and drone signals. Furthermore, each sector antenna is structured to combine high gain with a wide 90° beamwidth, which may be crucial in drone and drone control signal detection. As such, the sector antennas are designed primarily to detect a wide range of Industrial Scientific and Medical (ISM) bands and work efficiently in all-weather operations. Furthermore, each of the sector antennas further comprises an antenna gain. The gain of an antenna (antenna gain) can be generally defined as the ratio of the power required at the input of a lossless reference antenna to the power supplied to the input of the sector antennas to produce, in a given direction, the same field strength at the same distance. As a result, it is standard practice to use an isotropic radiator as the base reference antenna when measuring the antenna gain, preferably even in the case of sector antennas. Moreover, it is to be noted the reference antenna (isotropic radiator) is lossless and that it would radiate its energy equally in all directions. This ordinarily means that any gain of the antenna is compared to the isotropic radiator as its reference point. Chiefly, this means that the gain of the isotropic radiator is 0 decibels (dB). Additionally, it is also customary to use the unit dB (decibels) to measure antenna gain as it pertains to each of the sector antennas. Therefore, exemplifying this, the antenna gain for each of the sector antennas is selected from a group of ranges measured in decibels (dB). Accordingly, in at least one of preferred embodiments, the antenna gain can be selected from the range of between 10 decibels (dB) to 20 decibels (dB). Additionally, in one of the other preferred embodiments, the antenna gain can also be approximately 15 decibels (dB). Therefore, as it can be seen, it is preferred that each of the sector antennas is structured and configured to keep the antenna gain relatively high without affecting coverage.

Looking at this further, in one of the preferred embodiments, the range of the antenna gain is selected based on each of the sector antennas' ability to successfully detect and determine drone(s) and drone control signal(s) based on its distance from the antennas. For instance, using each of the sector antennas, the most dominant signal from the source direction of the drone control signal is detected. Generally speaking, detecting the most dominant signal may be crucial because replacing the most dominant signal with a consequential override signal can in effect suppress all the other lower frequency/power drone control signals associated with that particular drone. As such, each of the sector antennas of the detection antenna array is structured and configured to detect the most dominant signal from the source direction of the drone control signal. Furthermore, the detection of any of the drone control signals by each of the sector antennas is contingent on various factors. These may include, but are not limited to hopping intervals, frequencies, center frequencies, modulation types, frequency spreading factors and other non-standardized drone control signal protocols. Similarly, the detection of the drone control signal by each of the sector antennas can also depend on other factors, namely noise interferences, environmental factors, weather conditions, and other otherwise known elements. Additionally, in a general sense, it may be important to note that in the detection of the drone and drone control signal, the directional focus, the pattern and the number of sector antennas may influence results.

Looking further in one of the other preferred embodiments, it will be appreciated by those skilled in the art that the detection antenna array is structured and configured to detect a drone and a drone control signal over a 360-degree radius field relative to itself. In other words, the detection antenna array has omnidirectional detection capabilities, which generally compliments the multi-directional drone and drone control signal detection environment it may be used in. Accordingly, in at least one of the preferred embodiments, the detection antenna array can function as an omnidirectional antenna. The omnidirectional antenna has a non-directional pattern (circular pattern) in a given plane with a directional pattern in any orthogonal plane. As a result, omnidirectional antennas like dipoles and arrays are commonly known to radiate their power out in all directions in a plane, away from the vertical axis of the antenna. Given this, in one of the preferred embodiments, the detection antenna array is configured to detect drone control signal(s) from all directions (360 degrees) relative to itself.

Alternatively, in one of the other preferred embodiments the detection antenna array is structured and configured as a directional antenna, i.e., have more antenna gain in one direction compared to the other. As such, directional antennas have a higher antenna gain in one desired direction and the capacity to receive drone control signals generally from that direction. Moreover, directional antennas can be used for coverage as well as point-to-point links. For example, they can be patch antennas, dishes, horns or a whole host of other varieties. Directional antennas generally accomplish the same goal: radiating their energy out in a particular direction. Given this, in one of the preferred embodiments, the detection antenna array is configured to detect drone and drone control signal primarily from one selected direction only. Moreover, the detection antenna array is also structured to be adjusted based on its height, number of arrays, positioning, weather conditions, and overall topology of the operating environment. Essentially, it is preferred that the detection antenna array has the dimensions to sufficiently maximize the drone and drone signal detection capabilities.

Looking further in one of the other preferred embodiments, the detection antenna array is structured and configured to detect the directionality of the drone. More specifically, the detection antenna array detects the drone control signal transmitted by its source and based on its signal characteristics and other variables, precisely determine the directionality and position of the drone relative to the detection antenna array. For instance, when the detection antenna array detects the drone control signal, it transmits the signal back, enabling the system to receive and process the signal, thereby identifying the bearing of the drone, the drone control signal and its source relative to the position of the detection antenna array with greater accuracy and reliability. More specifically, in one of the preferred embodiments, the detection antenna array is configured to detect the drone and its drone control signal, within the vicinity of its detection radius. The dimensions of the detection radius can be limited or expansive, depending on the preference of the search. As a result, the dimensions of the detection radius can vary relative to the preference of detection, location of the drone, and the distance of the drone and the drone signal from the antenna.

Next, it will be appreciated by those skilled in the art that the detection antenna array can be configured to detect a wide range of bandwidths and frequency signals. Some of the frequency bands may include, but are not limited to, Industrial, Scientific and Medical (ISM) bands. As such, the detection antenna array can be configured to detect ISM bands anywhere from ultra-low 900 Megahertz (MHz) to the new extremely high 60 GHz. Additionally, in at least one preferred embodiment, the detection antenna array is configured to precisely detect the 2.4 GHz ISM band. As such, the 2.4 GHz ISM band is the known dominant band for remote control signals and having the configuration to detect in this dominant frequency serves the detection antenna array's purpose of detecting the strongest drone control signals. Alternatively, however, the detection antenna array can also be configured to detect other dominant bands in other frequency ranges, depending on the type and distance from the drones. Therefore, the selection of a specific frequency standard can depend on many factors including intended use, distance and direction of the drone, and type of drone control signal.

Looking further in one of the other preferred embodiments, the system also includes a neutralization system. The neutralization system is structured and configured in a communicating relation with said detection antenna array. This means that the neutralization system is configured to communicate with the detection antenna array, so as to sufficiently receive any and all drone and drone control signal related information. Accordingly, when drone control signal data is detected and received by the detection antenna array, the data is forwarded to the processing device to be further processed and analyzed. This is crucial because the drone control signal has to be precisely analyzed, ascertaining its signal protocols and frequencies, so that an identical or stronger override signal can be created and transmitted aimed in the direction of the drone. Accordingly, in one of the preferred embodiments, the neutralization system comprises a processing device, an amplifier, and a transmission antenna.

More specifically, in one of the preferred embodiments, the processing device is configured to create and effect the transmission of the override signal, based on the detection of the drone control signal. So then, the processing device comprises at least one computer, including at least one processor and memory, structured and configured to perform the operations described within this application. Additionally, the processing device further comprises executable and/or interpretable computer code, or software, that allows for the execution of output controls based on select input signals. The executable and/or interpretable programming languages extend to all those known to one skilled in the art, including but not limited to C, C++, C #, Ruby, Java, Dart, Rust, Swift, PHP, Perl, HTML, XHTML, and other equivalent languages and past, present and future variations. The processing device may house a library of known radio frequency spectrums, headers, and control signals within an attached or embedded storage, such that various control signals may be automatically selected depending on a detected radio frequency signal. The processing device may of course also allow for direct user input.

Furthermore, in at least one of the preferred embodiments, it will be appreciated by those skilled in the art that the processing device may be implemented as an application server in communication with a network, such as to allow for remote access by a user via a mobile or remote device. So then, in one of the preferred embodiments, the network may comprise the Internet, but may also comprise any other LAN, WAN, wireless or partially wired networks. Accordingly, additional communication hardware may be installed on the processing device to allow for communication over a network. Additional software components, such as server software for application(s), website(s), various network service(s), and respective databases may also be installed on the processing device. As such, the application server is configured with executable and/or interpretable computer code that allows it to perform the methods and processes described within this application, including the processing, analysis, and/or visualization of signal data for user interpretation. The application server may implement the methodology of using software methods described above, in conjunction with any number of solution stacks that allow the processing, analysis, and/or visualization of signal data to be executed remotely. These solution stacks may include, without limitation, ZEND Server, APACHE Server, NODE.JS, ASP, PHP, Ruby, XAMPP, LAMP, WAMP, MAMP, WISA, and others known to those skilled in the art. In such a preferred embodiment, the application server may also comprise or be communicably connected to a database, the database may comprise a SQL database or a text database, and may house any recorded signal data and the library of known drone frequency bands and control signals as described above.

Looking further in yet another one of the preferred embodiments, the processing device further comprises a software defined radio (SDR) configured to replicate the drone control signal. As such, SDR can comprise a wide variety of radio communication systems having components implemented by means of software, preferably on a computer like device or any other known embedded system. As far as programming is concerned, SDR can be reprogrammed quickly to transmit and receive signals on any frequency within a wide range of frequencies, using many transmission formats on various set of protocols. SDR also comprises reconfiguration by allowing control over modulation techniques, security functions (such as frequency hopping) and waveform requirements over a broad frequency range provided by a given software. As such, SDR is a radio communication technology that is based on software defined wireless communication protocols instead of hardwired implementations. More particularly, SDR includes software protocols that can wirelessly transmit and receive signals pertaining to drones and drone control signals in a given radio frequency part of the electromagnetic spectrum facilitating an accurate transfer of drone control signal related information.

In lieu of this, SDR comprises a collection of hardware and software technologies, where some or all of the SDR operating functions can be implemented through modifiable software or firmware operating on programmable processing technologies. Accordingly, in one of the preferred embodiments, SDR comprises a software defined radio and complimentary hardware components for executing all the functions of the SDR. The hardware components comprise embedded systems that are capable of performing the equivalent functions of hardware radio component, including but not limited to mixers, filters, amplifiers, modulators/demodulators, detects, converts, and other appropriate components. As such, SDR includes the use of an embedded general purpose or specialized computer such as, but not limited to, a processing device, or microcontroller, receiver(s), transmitter(s), and antenna(s). SDR can further comprise commercially available SDRs, SDR receivers, prebuilt SDRs, or SDR receiver kits mounted onto the UAV 200, such as SDRstick, ADAT, Apache Labs, SunSDR, Myriad-RF, FLEX, USRP, SoftRock, and others known to those skilled in the art. As far as frequencies are concerned, the SDR can cover all frequencies from 9 kHz (kilohertz) to 300 GHz. As a result, SDR can receive, transmit, modulate and demodulate all modulation modes and bandwidths of frequencies, while also being able to configure itself automatically or manually.

Looking further in one of the other preferred embodiments, the amplifier of the neutralization system is structured to boost the gain of the override signal to exceed the signal strength of the drone control signal. As such, the boost of the override signal due to the amplifier can be computed as the ratio of the power of the outputted override signal compared to the inputted drone control signal. In other words, the amplifier generally has a gain value in its output override signal that is at least equal to or stronger in signal strength (in decibels) compared to the inputted drone control signal. So then, the amplifier is configured to receive the inputted drone control signal in a readable format. This is because the processing device ensures that the override signal is processed in a readable format for the amplifier to be able to boost its gain. As such before the signal is transmitted, the amplifier adds energy to it, outputting the override signal that is generally greater than or equal in signal strength than the inputted drone control signal. So then, in at least one preferred embodiment, the override signal can include an exact replication of the drone control signal. More specifically, the override signal is configured to precisely mimic the drone control signal in terms of its frequencies, hopping intervals, center frequencies, modulation types and other frequency protocols. Accordingly, superseding the drone control signal with the override signal allows the system to render the control of the drone from its original operator at least partially and/or totally inoperative. Moreover, the override signal is not limited. It includes data that can also enable to engage the drone with new controlling commands. So then, the override signal is sufficient to not only disconnect the drone from its original operator, but to also cause the drone to accept new control commands. More specifically, the override signal is configured to allow the drone to accept new control commands that will disconnect the drone communicably from its original operator.

Looking into one of the preferred embodiments even further, the override signal can comprise a header of the drone control signal. As such, the header of the drone control signal can be a range of supplemental data that is placed at the beginning of the block data in the override signal being transmitted. So then, typically the header of the drone signal can comprise a sync word that would allow the drone to adapt to the analog amplitude, speed variations and signal synchronization. Alternatively, the header data can also be transparent and may not contain any details. So then, in one of the preferred embodiments, the header of the drone control signal is transmitted via the override signal as an initial set of bits to preliminary describe as to what the drone can expect to receive throughout the override signal data stream. As such, this may include but is not limited to the length, size, characteristics and amount of data, and other protocol functionality associated with the control of the drone. Furthermore, the header of the drone control signal may also contain information related to the version of the signal protocols used, the type of signal transmission and its function, the duration of the synchronization, sequence information to reduce errors in transmissions, and the specific order in which the signal transmission will occur. Even further, the header of the drone control signal incorporated in the override signal is crucial in situations where multiple drones exist. This is because header data in each override signal can target precise drones, thereby avoiding any confusion as to what drone the override signal is intended for. Furthermore, because transmission conditions themselves can change, coordination becomes a large issue in detecting drone control signals. So, even though management and control packets within the override signals are dedicated to these coordination functions, the headers of the drone control signal contain a great deal more information about network conditions and topology of the environment.

Next, in one of the other preferred embodiments, the override signal comprises an injected code. Ordinarily, the injected code in the override signal aims to partially or totally gain control of the drone. As such, the injected code can be created by the SDR. Given this, the injection of the replicated or spurious code, depending on the extent, format, and content of the code, can compromise proper operating functions of the drone from its original operator, at times even allowing for a complete takeover of its operative functions. Consequently, the injected code is configured to have precise details on controlling the drone as well as engaging it with new commands, sufficient to validate a safe capture of the drone without any potential physical damage.

Even further, in one of the other preferred embodiments, the override signal comprises random noise. Random noise can function to be an error or undesired random disturbance in the drone control signal pertaining to the drone's communication channel with the original operator. Ordinarily, it can be used as a signal jamming mechanism, aimed to intentionally disrupt communication channels between drones from its controlling sources. As such, other common types of signal jamming include random pulse, stepped tones, warbler, random keyed modulated CW, tone, rotary, pulse, spark, recorded sounds, gulls, and sweep-through. More specifically, random noise is an error or undesired random disturbance in the drone control signal, intentionally interfering the communication channel of the drone from the source. To demonstrate, the transmission antenna transmits the override signal, including the random noise incorporated within it. As such, the low power signal creates signal noise and tricks the drone source into thinking that the drone is no longer available. Furthermore, in other preferred embodiments, the low-signal transmitted random noise in the override signal causes random disturbances, jamming and interfering with the communication channel between the drone and the drone's original source. As a result, the source operator of the drone experiences malfunctioning in the controlling functions of the drone. Given this, the override signal can comprise the header, the injected control code and the random noise individually or collectively, sufficient to interfere, cease, and take control of the communication channel between the drone and its operator.

Looking further into one of the preferred embodiments, the amplifier also considerably increases the optimal range of the override signal by reducing any intermodulation of other signals and/or signal related data. For instance, the amplifier allows the override signal to maintain a purest path from the transmission antenna towards the drone, so as to retain the required signal strength necessary to override the drone control signal. As such, the amplifier maintains a strong override signal throughout the signal transmission process in the direction of the drone. For instance, the amplifier increases transmission lengths, permitting the override signal to reach drones at far greater ranges, without risking any decrease in drone control capabilities. Thus, the amplifier can improve the overall drone control distance and contribute towards robust signal stability. Similarly, the amplifier is structured and configured to increase the sensitivity of the transmission antenna when the override signal is transmitted towards the identified drone. This increased sensitivity of the transmission antenna makes up for any imbalance that may occur in the delivery of the override signal to the drone. Additionally, the amplifier is configured to amplify oscillations within a particular frequency band, while reducing oscillations at other frequencies outside the band.

Moving forward in reference to least one of the other preferred embodiments, the transmission antenna is structured to transmit the override signal aimed at the direction of the drone. As such, the transmission antenna can comprise a solid metal tube, a flexible wire with an end cap or a telescoping antenna, with sections nesting inside each other when collapsed. So then, in order to effectively transmit the override signal in the direction of the drone, the transmission antenna is configured to convert electric energy into transmittable signal frequencies in the form of override signals, preferably identical and stronger than the inputted drone control signals. More particularly, the transmission antenna can function in one direction or be omnidirectional, depending on the preference, distance and location of the drone. This means that the transmission antenna can transmit override signal in one preferred directions or in all directions. As such, the override signal is configured to be identical in signal characteristics to the drone control signal, and thus, override it so as to render the drone's control from its original source/operator inoperative. Additionally, if the inputted drone control signal is in a higher frequency, the transmission antenna is structured and configured to convert the higher rate of electrical energy supplied to it in a higher frequency, sufficient for the override signal to supersede the drone control signal in the higher frequency. As such, the frequencies transmitted by the transmission antenna can be adjusted and configured relative to the frequencies detected from the drone and the drone control signal regardless of the frequency level or other signal protocols.

Looking further in one of the preferred embodiments, the system includes an alternate antenna system. The alternate antenna system is configured to transmit at least one pulse of 2.4 Ghz energy from a magnetron source. As such, the magnetron source can be any high power microwave oscillator, in which the potential energy of at least one electron cloud near the cathode is converted into radio frequency energy. As such, the magnetron source or any other similar source capable of creating pulse of such energy supplies the alternate antenna with the desired energy to be consequently transmitted. For instance, in one of the preferred embodiments, the energy from the magnetron is introduced when the initial lower frequency based override signal transmitted by the transmission antenna does not affect the drone control signal. In other words, when the drone is operating at a higher frequency than the frequency of the override signal, the initially transmitted override signal may not affect the drone's existing controls. Therefore, a subsequent higher frequency signal created by the magnetron source can be transmitted to override such higher frequency drone control signals. Likewise, the energy pulse from the magnetron source via the alternate antenna is also introduced if the drone is controlled by multiple signals (at lower and higher frequencies). Accordingly, in such cases, transmitting the higher frequency signal created by the magnetron source can offset the remaining higher frequency drone control signal(s), sufficient to render any existing controls of the drone partially or totally inoperative from its source. Wherefore, the alternate antenna system can effectively transmit high frequency energy generated from the magnetron source. As a result, when the magnetron source creates the energy of at least 2.4 Ghz, it is aimed and transmitted in the direction of the drone via the alternate antenna system.

Furthermore, in at least one of the preferred embodiments, the alternate antenna system comprises a horn antenna. The horn antenna is configured to amplify and/or transmit at least one pulse of the 2.4 GHz generated by the magnetron source aimed precisely in the direction of the detected drone. As an example, the horn antenna can be structured as a flaring metal waveguide shaped like a horn to direct the desired high level frequency in the form a beam in the direction of the drone. As such, the horn antenna can be configured to transmit at various frequencies, but preferably at least above 300 (MHz). The horn antenna is structured, dimensioned and configured to have moderate directivity, low standing wave ratio, broad bandwidth, simple construction and adjustable structure. Moreover, the horn antenna is configured to minimize any interruptions such as unwanted signals not in the favored direction of the drone and drone control signal, by effectively suppressing them. As such, the horn antenna has no resonant elements and is configured to operate at a wide range of bandwidths.

Looking further, into one of the preferred embodiments of a method associated with detecting and defeating a drone, the method comprises continuously scanning for remote control signals on a detection antenna array in order to detect the drone and the drone control signal. Accordingly, to continuously scan, the detection antenna array is configured to detect ISM bands or any other related bands ranging from ultra-low 900 MHz (Megahertz) to an extremely high 60 GHz, including, but not limited to the preferable 2.4 GHz ISM band, which is widely recognized as the dominant band for remote controls operating drones. Given this, the selection of ISM bands standard can depend on the direction, environment, intended use, and distance of the drone and/or drone control signal. Additionally, a display screen indicating the detection and direction of the drone and the drone signal can also be included as part of the preferred embodiment.

Looking further, the source direction of the drone signal on the detection antenna array is determined. The directional determination of the drone signal can occur by directing the focus towards one particular direction in which the drone is specifically detected, or alternatively, omnidirectional, in order to search drones in all directions existing within the given search range. As such, it will be appreciated by those skilled in the art that the comprehensive signal detecting capabilities of the detection antenna array is configured for directional detection and omnidirectional detection of drone control signal(s). Moreover, the directional antenna array is configured to measure and determine the frequency hopping intervals, the center frequencies, the modulation types, the frequency spreading factors, and compare any of the detected drone control signal(s) to other standard and non-standard drone control signal protocols stored on hand on a computer and/or a micro-controller system. Accordingly, the directional antenna array can be configured to detect and determine the characteristics of the detected drone control signal by taking into account factors including, but not limited to direction, distance, intensity quality, and external noise interferences. This precise determination by the directional antenna array enables the neutralization system to create the desired override signal. For instance, once a drone control signal is detected and determined by the detection antenna array, the override signal is created on the neutralization system based on the detected drone control signal. Consequently, the neutralization system ensures that the override signal created, is identical in its protocol and specifications to the strongest drone control signal detected pertaining to any given drone.

Next looking further, the override signal is transmitted from the transmission antenna connected to the neutralization system, aimed towards the source direction of the drone control signal. The override signal is transmitted via the transmission antenna. Again, the override signal is replicated to match the detected drone signal, or alternatively, the override signal is protocol synthesized drone control signal aimed at the direction of the drone. So then, the override signal can also be configured to guide the detected drone in case of signal loss or motor shut down. More particularly, the override signal allows for the drone to be safely controlled in the event that the override signal disrupts the drone's existing drone control signal to make it operationally ineffective. As such, in one of the preferred embodiments, there is no lag time from when the drone control signal loses its control of the drone functions from its original operator, and the override signal simultaneously takes control. So then, the override signal transmitted by the transmission antenna can be configured to suppress any existing drone control signals making it cumbersome for its original operator to maintain control of the drone. Consequently, the identical characteristics of the override signal offsets the drone control signal by replacing it, thus, relinquishing it from its operative capabilities, by disconnecting it from its original operator.

Referring again to the methods of detecting and defeating a drone, the system periodically terminates the override signal transmission from the transmission antenna. The periodic termination of the drone override signal may occur at various preferred intervals. As such, this depends on several factors related to the drone and drone control signal detection. For instance, situations may occur where the initial override signal transmitted by the transmission antenna fails to completely override and/or offset the drone control signal. Consequently then, the periodic termination of the override signal transmission helps the system determine, if the override signal is affecting the drone control signal. Additionally, it also helps to understand whether there are any other remaining remote drone control signals still controlling the drone, which have not been overridden by the initially transmitted override signal.

Looking further, additional remote control signals are scanned in order to detect any supplemental drone control signal(s). This is because other supplemental drone control signals may exist besides the originally detected drone control signal that may be contributing secondarily or as a backup in retaining the control of the detected drone. For instance, supplemental drone control signal(s) can serve as a backup to the primary drone control signal in situations where the original drone control signal may have lost communication with its operator when the initial override signal was transmitted. Accordingly, once a supplemental drone control signal is detected, a supplemental override signal is created on the neutralization system based on the detected supplemental drone control signal. As such, the supplemental override signal is configured to be identical or stronger in signal strength than the supplemental drone control signal. Once transmitted, the supplemental override signal then overrides the supplemental drone control signal related to the drone, defeating its control therein. Therefore, in one of the preferred embodiments, the override signal and the supplemental override signal, collectively are transmitted from the transmission antenna towards the direction of the drone. This ensures that the original drone control signal and the supplemental drone control signal are both overcome. Alternatively, in other preferred embodiments, the supplemental override signal can be transmitted separately and in intervals towards the direction of the drone for the same purpose as well.

As indicated, the method for detecting and defeating the drone in at least one of the preferred embodiments comprises: continuously scanning for remote control signals on the detection antenna array in order to detect the drone control signal, determining the source direction of the drone control signal on the detection antenna array, creating an override signal on the neutralization system based on the detected drone control signal and transmitting the override signal from the transmission antenna connected to the neutralization system towards the source direction of the drone control signal. Accordingly, after the override signal from the transmission antenna is transmitted, the system scans for a video link associated with the detected drone. As such, the video link formats may include, but is not limited to .flv, .ogv, .drc, .mng, .avi, .wmv, yuv, .rm, .rmvb, .asf, .webm, .mp4, .m4p, .mpg, .mpeg, .nsv, .mov, .swf and .3pg, as well as any other media or streaming formats. Moreover, the video link may also be scanned at various frequencies. Accordingly, in the preferred embodiment, the video links associated with the detected drone, regardless of the file size, resolution and compatibility can be scanned at any given frequency. So then, it will be appreciated by those skilled in the art that in the preferred embodiment, the video link associated with the detected drone can be scanned on the 5.8 GHz ISM band. Additionally, the video link associated with the detected drone can also be scanned on a 915 MHz ISM band. The ISM bands allow for the video link of any aerial footage captured in real time by the detected drone to be sent back to the neutralization system to be recorded for display. Wherefore, the recorded footage captured by the drone, can be viewed on any electronic display equipment. Given this, the recorded footage as viewed, can be used for real time feedback of drone behavior and other telemetry data which will be explained in greater detail below.

Looking further, in at least one embodiment, the video formats can include any type of synchronization information, subtitles, and metadata associated with the video link. So then, in this preferred embodiment, once the video link is scanned and detected, the video feed associated with the video link is recorded by the system. Upon recording the video, an alternate video feed signal to the drone is periodically injected, in order to interfere with the piloting of the drone. More specifically, real time feedback of drone behavior and other related telemetry data, including but not limited to GPS positions, battery voltage, images of drone operation and precise location of its operator is recorded. Hence once recorded, the image data is analyzed not only to determine how the control of the drone will be precisely negotiated, but also to interfere with the control of the drone. As such, in one of the preferred embodiments, an alternate video feed signal to the drone is periodically injected in order to confuse, interfere and incapacitate the piloting of the drone from its original operator. More particularly, the alternate video feed signal periodically injected is configured to repeat the video footage already recorded by the drone. As an example, this is done in a repeated, looped time frame format, so as to trick its operator in believing that he/she still has control of the drone and temporarily avoid any suspicion of hostile takeover of controls of the drone.

Furthermore, in at least one alternative preferred embodiment, when the detection antenna array detects the drone control signal, along with its precise or approximate positioning, the positioning of the drone is relayed to an external directionally controllable object launcher. In other words, when the drone is detected within a reasonable distance, a directionally controllable object launcher equipped with tennis balls or other similar objects receives the positioning of the drone. As such, the object launcher may comprise a paint gun, a slime gun, a net or a water cannon. Furthermore, any information in regards to the positioning of the drone can be communicated to the object launcher manually or automatically. As such, the directionally controllable launcher is configured to launch tennis balls or similar objects aimed towards the drone, so as to cause direct impact, physically knocking it down from the sky without causing any substantial risk of injury to others in its path or otherwise. For instance, drones are used to deliver illegal drugs within prisons, notwithstanding the rigid confines and the presence of law enforcement. As such, prisons have a solution to eradicate the delivery of illegal substances via drone delivery. This is because prisons or other places alike having directionally controlled object launchers can easily be configured to receive information about drone location, once obtained from the system. Accordingly and merely as an example, once the information on the positioning of the drone is relayed to the object launcher by the system, the directionally controllable object launcher will rapidly shoot tennis balls or other similar objects targeting the drone. As such, the tennis balls or similar objects physically impact the drone, knocking it down without causing substantial injury to any prison inmates or law enforcement officers and simultaneously ceasing any illegal activity therein.

In at least one other preferred embodiment, an infrared camera can be mounted on a drone to detect other drones. This infrared camera mounted drone is configured to provide real time visual feed of the detected drone. As such, the visual of the detected drone via the mounted infrared camera would supplement the system to ascertain the make and model of the detected drone, thus enabling the system to speed up the process of detection by transmitting the overriding signal without any further ado. As such, in at least one of the preferred embodiments, the system is configured to detect the make and model of the detected drone.

Looking even further, the method for detecting and defeating the drone according to at least one preferred embodiment comprises: continuously scanning for remote control signals on the detection antenna array in order to detect the drone control signal, determining the source direction of the drone control signal on detection antenna array, creating the override signal on the neutralization system based on the detected drone control signal and transmitting the override signal from the transmission antenna connected to the neutralization system towards the source direction of the drone control signal. These methods have been explained in great detail above. Given this, after transmitting the override signal from the transmission antenna towards the source direction, the detection antenna array detects the effect of the override signal transmitted from the transmission antenna on the drone. More specifically, the detection antenna array detects whether the override signal transmitted in the direction of the drone has effectively overridden the drone control signal, so as to render the drone uncontrollable from its source. As such, one of the preferred embodiments includes the override signal being operative on the drone, so as to override the existing drone control signal. So then, further measures pertaining to control and capture of the drone may proceed. No other alternate signals of higher frequency need to be transmitted. However, if the effect of the override signal is inoperative on the drone, at least one of the preferred embodiments includes proceeding with subsequent measures pertaining to transmitting stronger frequency based signals. More particularly, once the override signal is ineffective in offsetting the drone control signal in regards to partial or total control of the drone, an energy pulse of higher frequency is consequently transmitted. This will be described in greater detail below.

In at least one preferred embodiment, if no discernible effect on the drone can be detected, at least one pulse of 2.4 Gigahertz GHz energy from a magnetron source through an alternate antenna system is transmitted. The magnetron source offers high energy conversion efficiency and can be configured to reduce the risk of interference by shifting the magnetron source's resonant frequency in a more desirable frequency spectrum conducive to conditions for drone control. Furthermore, it is noted that some of the remote control signals operate at a frequency of 2.4 GHz, the same frequency standard at which most Wi-Fi standards 802.11g, 802.11n, IEEE 802.15.4 based wireless data networks, and Bluetooth devices operate on nowadays. Given this, the 2.4 GHz pulse of energy is transmitted via the alternate antenna system aimed in the direction of the drone. Accordingly, the alternate antenna system comprises a horn antenna. The horn antenna is configured to receive at least one pulse of 2.4 GHz energy from the magnetron source. As such, given its far field pattern, the horn antenna is also configured to transmit this energy in a beamed format aimed towards the drone. It can provide a higher power handling and lower insertion loss transition for the 2.4 GHz energy coupled out of the magnetron source. Given all of this, in one of the preferred embodiments, if no apparent effect is detected when the initial override signal is transmitted, the horn antenna of the alternate antenna system consequently transmits at least one pulse of 2.4 GHz energy aimed towards and/or approximately near the drone, sufficient to gain control of the drone. Alternatively, in one of the other preferred embodiments, at least one pulse of 2.4 Gigahertz GHz energy from a magnetron source can also be transmitted via the horn antenna of the alternate antenna system in situations where alternate, manipulated video feed signals are required to be injected periodically in the 2.4 GHz frequency range towards the drone so as to confuse its operator and make operation of the drone cumbersome.

Furthermore, the method for detecting and defeating the drone in one of the preferred embodiments comprises: continuously scanning for remote control signals on the detection antenna array in order to detect the drone control signal and determining the source direction of the drone control signal on the detection antenna array. These are aforementioned in greater detail above. Thereupon, the signal characteristics and protocols of the drone control signal are particularly determined. More specifically, once the drone control signal is detected by the detection antenna array, the processing device receives the data from the detection antenna array. It then determines the characteristics and other protocols of the drone control signal, including but not limited to factors such as frequency levels, modulation types, and frequency spreading factors. Consequently, after making a precise determination, the drone control signal characteristics and other protocols are compared against the various data stored in the processing device. In other words, the signal characteristics of the drone control signal are compared with the data stored in the library on the processing device. As a result, an identical match based on the comparison and analysis with the drone control signal is determined. Generally, the library stored on the processing device is comprehensive. As a result, the library comprises a wide spectrum of frequencies data including, but not limited to ultra-low 900 MHz to the new extremely high 60 Gigahertz GHz. The library also contains other relevant information on various standard and non-standard center frequencies, bandwidths, modulations and other remote control signal protocols. In essence, the library stored on the processing device comprises all the relevant information, sufficient to determine, create and transmit a counterpart override signal based on the detected drone control signal. As such, the override signal can also be closely associated or stronger in signal strength, if not identical to the signal characteristics of the detected drone control signal. In other words, the override signal is created based on its precise specifications in signal characteristics and protocols to the detected drone control signal. As such, the signal characteristics may comprise determining the frequency hopping interval of the drone control signal, determining the center frequency of the drone control signal, determining the modulation type of the drone control signal and determining the frequency spread of the drone control signal.

More specifically, looking at the signal characteristics in one of the preferred embodiments, frequency hopping is performed by changing frequencies while communicating with the drone. Ordinarily, frequency hopping can be slow, which means that several data (bits) are transmitted during each hop. However, alternatively it can be changed to be fast as well. As such, several frequency hopping patterns can be transmitted in the same frequency range without interfering with one another. Moreover, signal energy can be narrow or spread over a wider frequency range depending on the nature of the drone control signal. Next, the center frequency of the drone control signal is determined in order to resonate at a particular frequency of the drone control signal. As such, the center frequency for each drone control signal has a certain bandwidth, or range of frequencies that it will allow towards the center, between the upper and lower cutoff frequencies. Accordingly, this may ensure that the override signal created has a high probability to override the drone control signal. Thus, determining the center frequency allows a rejection of any signal outside the bandwidth of the drone control signal frequency. Looking further within signal characteristics, the modulation type of the drone control signal is determined by analyzing bandwidths, frequency spectrums and sidebands. More specifically, the modulation type of the drone control signal can be determined via amplitude modulation, frequency modulation and phase modulation. Looking even further, the frequency spread of the drone control signal is determined in order to ascertain the particular bandwidth the drone signal is operating within. This allows for the override signal to stay within the bandwidth of the drone, ignoring any signals outside the drone control signal's frequency spread.

Next, the override signal is transmitted from the transmission antenna connected to the neutralization system towards the source direction of the drone control signal. As aforementioned earlier, the override signal transmitted via the transmission antenna is replicated to match the detected drone signal. Alternatively, it can also be a protocol synthesized drone control signal aimed at the direction of the drone. As such, in one of the preferred embodiments, the override signal is configured to capture and direct the detected drone by controlling its operations, in case of signal loss or motor shut down. In other words, the override signal allows for the drone to be safely controlled and captured, when the override signal immediately disrupts or malfunctions the drone's existing drone control signal from its source. Similarly, the override signal transmitted by the transmission antenna is configured to suppress any existing drone control signals making it extremely cumbersome for its original operator to maintain control of the drone. In other words, the override signal offsets the drone control signal, relinquishing any and all of the drone's control from its original operator. Given this, the override signal takes over the drone's controls including its navigation capabilities so as to result in safe landing without any structural damages. As such, the override signal is configured to allow the renewed control of the drone to safely capture and land the drone to any given preferred destination. Accordingly, a series of override signals can be transmitted with specific protocols, continuously aimed towards the given drone, so as to ensure that any missing or unaffected codes are recognized and resulted. Thus, this allows for the override signal to effectively control, capture and land the drone according to plan. Consequently, in one of the preferred embodiments, to further compliment in controlling the drone, frequencies related to the drone's video links are also continuously relayed back and forth aimed at the drone, in order to get real time visual data as viewed via the drones cameras. As a result, this allows for a real-time visual with can further help in an effective control, capture and landing of the drone.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
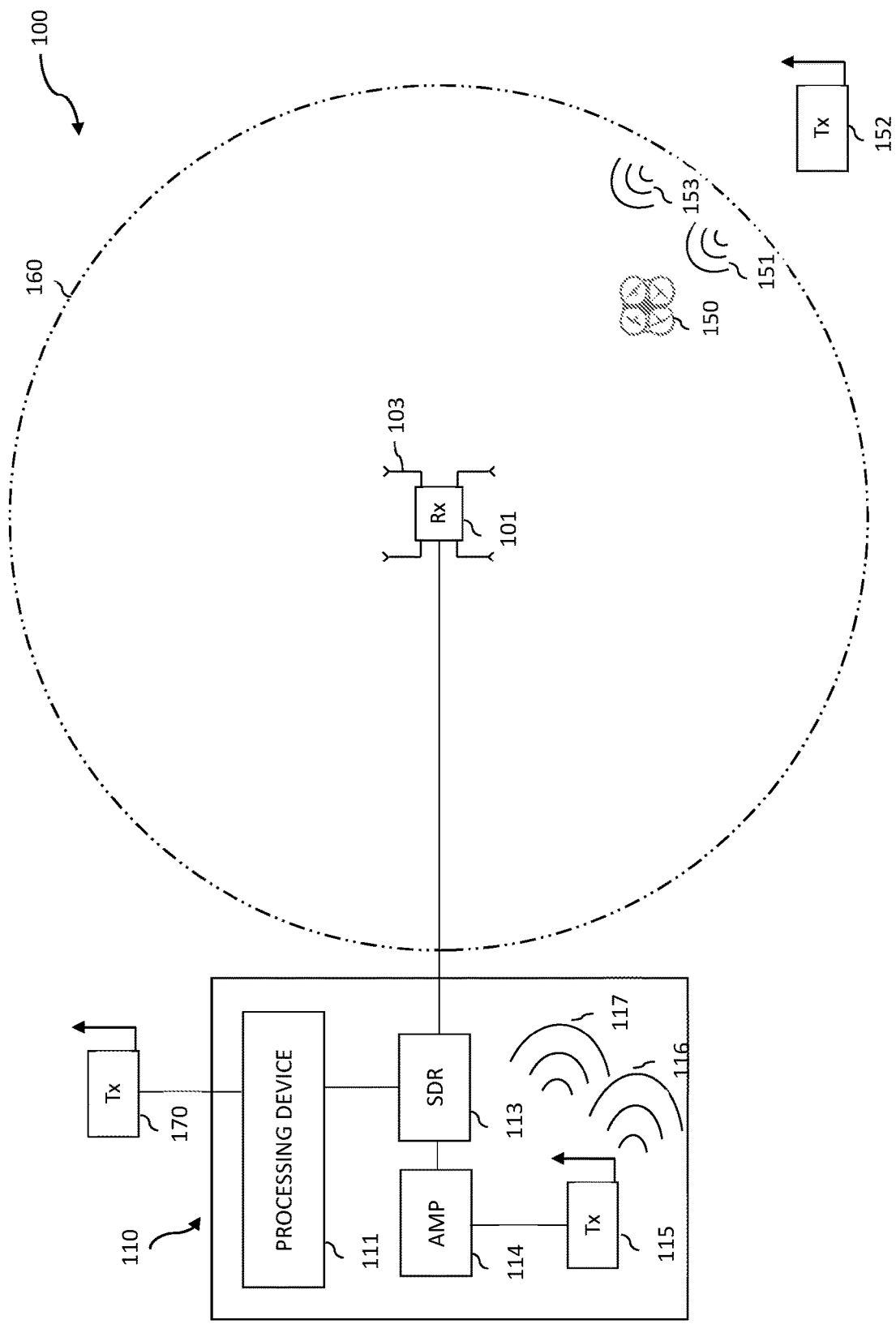
FIG. 1 is a diagrammatic representation illustrating a system of the present invention for detecting and defeating a drone.

As shown in the accompanying drawings, the present invention is generally directed to a system and method for detecting and defeating a drone. More particularly, FIG. 1 illustrates a system 100 for detecting and defeating a drone 150. The system 100 generally includes a detection antenna array 101. The detection antenna array 101 generally is a set of two or more antennas and installed in various geometric arrays. In fact, in one of the preferred embodiments, the detection antenna array 101 includes a set of four 90-degree sector antennas 103. So then, each of the sector antennas 103 further comprises an antenna gain (not shown). The antenna gain is the ratio of the power required at the input of a loss-free reference antenna to the power supplied to the input of the given antenna to produce, in a given direction, the same field strength at the same distance. Given this, the antenna gain can be selected from a group of ranges in decibels (dB). The preferred ranges of the antenna gain are selected based on the sector antennas' 103 ability to detect and determine a drone(s) 150 and a drone control signal(s) 151 within a given distance. Therefore, in at least one preferred embodiment, using each of the sector antennas 103 of the detection antenna array 101 or other similar direction-finding array systems, the strongest signal from the source direction of the drone control signal 151 is detected. As such, each of the sector antennas 103 of the detection antenna array 101 is configured to detect the most dominant signal from the source direction of the drone control signal 151. Given this, the detection of drone control signals 151 is contingent on various factors including, but not limited to hopping intervals, frequency strengths, center frequencies, modulation types, frequency spreads and other non-standardized drone control signal protocols. Likewise, the detection of the drone control signal 151 by the sector antennas 103, including the antenna gain selected, can further depend on many factors, including noise interferences, environmental factors, weather conditions and directional preferences. Exemplifying this point even further, it is equally important to note that in the detection process of the drone control signal 151, the distance from the drone 150, the pattern of the antenna arrays and the number of arrays of the sector antennas 103 can be factored in as well. Accordingly, in at least one preferred embodiment, the antenna gain can be selected from the range of between 10 decibels (dB) to 20 decibels (dB). Alternatively, in one of the other preferred embodiments, the antenna gain can also be approximately 15 decibels (dB). Therefore, depending on the location of the drone and type of antenna used in detecting drone control signals 151, the antenna gain can be selected from a range of decibels or an approximate decibel as demonstrated above.

Looking further in one of the other preferred embodiments, it will be appreciated by those skilled in the art that the detection antenna array 101 is structured and configured to detect a drone 150 and a drone control signal 151 over a 360-degree field, in relation to the detection antenna array 101. In other words, the detection antenna array 101 has omnidirectional detection capabilities relative to itself. This is especially significant, given the multi-directional drone 150 and drone control signal 151 detection environment.

Alternatively, in at least one preferred embodiment, the detection antenna array 101 is configured as a directional antenna. As such the detection antenna array 101 is this embodiment is structured to function more effectively in receiving drone control signals 151 in some directions than in others. More specifically, the detection antenna array 101, when functioning as a directional antenna, will ordinarily exhibit unidirectional properties. In other words, the maximum antenna gain (increase in efficiency) in this preferred embodiment occurs in a single direction.

Similarly, in other preferred embodiments, the detection antenna array 101 can be adjusted based on factors including, but not limited to height, number, positioning and topology of the operating environment, sufficient to maximize its detection capabilities. Accordingly, the detection antenna array 101 is structured and configured to detect the directionality of the drone 150. More specifically, the detection antenna array 101 is structured and configured to detect a drone control signal 151 transmitted by a drone control source 152, and the directionality or location of the drone 150 relative to the detection antenna array 101. To exemplify this, the detection antenna array 101 is configured to detect a drone 150 within the vicinity of its detection radius 160. So then, the detection radius 160 of the detection antenna array 101 can be expansive, but in an alternate embodiment, it can also be restrictive, depending on the preference, purpose and focus of the drone detection. Knowing this, the dimensions of the detection radius 160 can vary depending on many factors—preference of detection, location of the detection antenna array 101 and the distance of the drone 150 and the drone control signal 151.

Looking further, it will be appreciated by those skilled in the art that the detection antenna array 101 can be configured to detect a wide range and types of frequency signals. Some of the frequency bands can include, but is not limited to Industrial, Scientific and Medical (ISM) bands. As such, the detection antenna array 101 can be configured to detect ISM bands anywhere from ultra-low 900 Megahertz (MHz) to the new extremely high 60 Gigahertz GHz. Accordingly, in at least one preferred embodiment, the detection antenna array 101 is configured to detect the 2.4 GHz ISM band. The 2.4 GHz ISM band is known to be the dominant band for more known remote control signals. As such, having the configuration in this dominant frequency allows the detection antenna array's 101 to detect the strongest available drone control signals 151. Alternatively, however, the detection antenna array 101 is configured to detect other dominant bands in other frequency ranges. Therefore, the selection of a specific frequency standard can depend on many factors, including the intended use, distance, and direction and type of drone 150 and the drone control signal 151.

Next, referring specifically to FIG. 1 as an illustration, the system 100 includes a neutralization system 110. The neutralization system 110 is structured and configured in a communicating relation with said detection antenna array 101. As such, the neutralization system 110 communicates with the detection antenna array 110 in order to receive any and all drone 150 and drone control signal 151 related data detected by the detection antenna array 110. So then, upon detection, the data is communicated with the neutralization system 110 and then forwarded to the processing device 111 to be further analyzed. This analysis of the drone control signal 151 detected by the detection antenna array 110 may be helpful. This is because the analysis of the drone control signal 151 allows the processing device 110 to ascertain the relevant frequency protocols, frequency bandwidths, frequency formats, center frequencies and modulation types.

Furthermore, the thorough analysis of the detected drone control signal 151 by the processing device 111 contributes in creating an identical override signal 116. Accordingly, the override signal 116 is created, and then consequently aimed in the direction of the drone 150. Therefore, all things considered, in one of the preferred embodiments, the neutralization system 110 comprises a processing device 111, an amplifier 114, and a transmission antenna 115. As such, each of the aforementioned will be explained in greater detail below.

Referring again to FIG. 1, the processing device 111 is configured to create and effect the transmission of the override signal 116 based on the detection of the drone control signal 151. As such, the processing device 111 comprises at least one computer, including at least one processor and memory, structured and configured to perform the operations described within this application. Additionally, the processing device 111 further comprises executable and/or interpretable computer code, or software, that allows for the execution of output controls based on select input signals. The executable and/or interpretable programming languages extend to all those known to one skilled in the art, including but not limited to C, C++, C #, Ruby, Java, Dart, Rust, Swift, PHP, Perl, HTML, XHTML, and other equivalent languages and past, present and future variations. The processing device 111 may house a library of known radio frequency spectrums, headers, and control signals within an attached or embedded storage, such that various control signals may be automatically selected depending on a detected radio frequency signal. The processing device 111 may of course also allow for direct user input. As such, any new control signals that are not recognized can be added to the library of the processing device 111.

Furthermore, in at least one of the preferred embodiments, the processing device 111 may be implemented as an application server in communication with a network, such as to allow for remote access by a user via a mobile or remote device. The network may comprise the Internet in a preferred embodiment, but may also comprise any other LAN, WAN, wireless or partially wired networks. Accordingly, additional communication hardware may be installed on the processing device 111 to allow for communication over a network. Additional software components, such as server software for application(s), website(s), various network service(s), and respective databases may also be installed on the processing device 111. The application server is configured with executable and/or interpretable computer code that allows it to perform the methods and processes described within this application, including the processing, analysis, and/or visualization of signal data for user interpretation. The application server may implement the methodology of using software methods described above, in conjunction with any number of solution stacks that allow the processing, analysis, and/or visualization of signal data to be executed remotely. These solution stacks may include, without limitation, ZEND Server, APACHE Server, NODE.JS, ASP, PHP, Ruby, XAMPP, LAMP, WAMP, MAMP, WISA, and others known to those skilled in the art. In such a preferred embodiment, the application server may also comprise or be communicably connected to a database, the database may comprise a SQL database or a text database, and may house any recorded signal data and the library of known drone frequency bands and control signals as described above.

Referring again to FIG. 1, in one of preferred embodiments, the processing device 111 further comprises a software defined radio (SDR) 113 configured to replicate the drone control signal 151. The SDR 113 can comprise a wide variety of radio communication systems having components implemented by means of software, preferably on a computer like device or any other known embedded system. Given this, the SDR can wirelessly transmit and receive signals pertaining to drones 150 and drone control signals 151 in the radio frequency part of the electromagnetic spectrum, which further helps to facilitate a precise transfer of drone control signal related information. Furthermore, SDR 113 can comprise a collection of hardware and software technologies, where some or all of the SDR 113 operating functions can be implemented through modifiable software or firmware operating on programmable processing technologies. Accordingly, in one of the preferred embodiments, SDR 113 comprises a software defined radio and appropriate hardware components for effectively executing the SDR 113. The hardware components comprise embedded systems that are capable of performing the equivalent functions of hardware radio components, including but not limited to mixers, filters, amplifiers, modulators/demodulators, detects, converts, and other appropriate components. SDR 113 can include the use of an embedded general purpose or specialized computer such as processing device 111, or microcontroller, receiver(s), transmitter(s), antenna(s). Moreover, SDR may further comprise commercially available SDRs, SDR receivers, prebuilt SDRs, or SDR receiver kits mounted onto the UAV 200, such as SDRstick, ADAT, Apache Labs, SunSDR, Myriad-RF, FLEX, USRP, SoftRock, and others known to those skilled in the art.

Furthermore, referring again to FIG. 1, in one of the preferred embodiments, the amplifier 114 of the neutralization system 110 is structured to boost the gain of the override signal 116 to exceed the signal strength of the drone control signal 151. As such, the boost of the override signal 116 due to the amplifier 114 can be computed as the ratio of the power of the outputted override signal 116 compared to the inputted drone control signal 151. This means that the amplifier 114 generally has a gain value in its output override signal 116 that is stronger in decibels compared to the inputted drone control signal 151. Given this, the amplifier 114 receives the inputted drone control signal 151 in a readable format, adds energy to it, outputting the override signal 116, which is generally greater than or equal to in signal strength to the inputted drone control signal 151. As such, in at least one preferred embodiment, the override signal 116 can include an exact replication of the drone control signal 151. More specifically, the override signal 116 can be configured to precisely mimic the drone control signal 151 in terms of, but not limited to its frequencies, hopping intervals, center frequencies, modulation types and other known protocols, and consequently override it. Overriding allows the system 100 to render the control of the drone 150 from its original operator at least partially and/or totally inoperative. As such, the override signal 116 is not limited. It includes data that can enable renewed control of the drone 150, sufficient enough for the drone 150 to be manipulated to not only disconnect from its original operator, but to also override the old drone control signal 151 with new control commands. As such, the override signal 116 is configured to allow the drone 150 to accept new control commands, sufficient for the drone 150 to be disconnected communicably from its original operator safely captured therein. Given this, the override signal 116 is configured to contain new control signal data information that not only disengages the drone 150 from its original operator, but also permits renewed control of the drone 150 sufficient to safely capture it. Additionally, the override signal 116 is configured to have a signal strength of greater frequency than the strongest allowable drone control signal 151.

Furthermore, the override signal 116 can comprise a header of the drone control signal (not shown). As such, the header of the drone control signal can refer to the supplemental data that is placed at the beginning of a block data in the override signal 116 being transmitted. As such the header of the drone signal may contain information including but not limited to the source, destination and control information. Alternatively, the header data can also be transparent about the transmission details. Given all this, in one of the preferred embodiments, the header of the drone control signal is transmitted in the override signal 116 as an initial set of bits to preliminary describe as to what the drone 150 can expect to receive throughout the override signal 116 data stream, including but not limited to the length, size, characteristics and amount of data, and other transmission units logically or physically associated to overriding the drone control signal 151. Additionally, in one of the preferred embodiments, the override signal comprises an injected code (not shown). As such, the injected code in the override signal aims to gain control of all or part of the drone 150. The injected code can be made through the interface of the SDR. As such, the injection of the replicated or spurious code, depending on the extent, format, and content of the code, can compromise proper operating functions of the drone 150 from its original operator or even allow for a complete takeover of it. This means that the injected code can have precise details on controlling the drone 150 as well as engaging it with new commands sufficient to validate a safe capture of the drone 150 without any potential physical damage. Even further, in one of the other preferred embodiments, the override signal 116 comprises random noise. Random noise can function to be an error or undesired random disturbance in the drone control signal 1151 pertaining to the drone's 150 communication channel with the original operator. As such, random noise can be a summation of unwanted or disturbing energy that interferes in the communication channel of the drone control signal 151 and the original operator. So, given all this, when the transmission antenna 115 transmits the override signal 116 towards the direction of the detected drone 150, it can comprise the header, the injected control code and the random noise individually or collectively, at least sufficient to interfere, cease, and take control of the communication channel between the drone 150 and the original operator.

Furthermore, the amplifier 114 as illustrated in FIG. 1, considerably increases the optimal range of the override signal 116 by reducing any intermodulation of other signals and/or signal related data. For instance, the amplifier 114 allows the override signal 116 to maintain a purest path from the transmission antenna 115 towards the drone 150, so as to retain the required signal strength necessary to override the drone control signal 151. As such, the amplifier 114 maintains a strong override signal 116 throughout the signal transmission process in the direction of the drone 150. Merely as an example, the amplifier 114 increases transmission lengths, permitting the override signal 116 to reach drones 150 at far greater ranges, without risking any decrease in drone control capabilities. Thus, the amplifier 114 can improve the overall drone control distance and contribute towards robust signal stability. Similarly, the amplifier 114 is structured and configured to increase the sensitivity of the transmission antenna 115, when the override signal 116 is transmitted towards the identified drone 150. This increased sensitivity of the transmission antenna 115 makes up for any imbalance that may occur in the delivery of the override signal 116 to the drone 150. Additionally, the amplifier 114 is configured to amplify oscillations within a particular frequency band, while reducing oscillations at other frequencies outside the band.

Referring again to FIG. 1, in at least one preferred embodiments, the transmission antenna 115 is structured to transmit the override signal 116 aimed at the direction of the drone 150. As such, the override signal 116 is configured to be transmitted at various frequencies depending on the received drone control signal 151. Structurally speaking, the transmission antenna 115 can comprise a solid metal tube, a flexible wire with an end cap or a telescoping antenna, with sections nesting inside each other when collapsed. Thus, in order to effectively transmit the override signal 116 in the direction of the drone 150, the transmission antenna 115 is configured to convert electric energy, into transmittable frequencies in the form of the override signal 116, preferably identical or stronger than the inputted drone control signal 151. Accordingly, the transmission antenna 115 can transmit the override signal 116 in one direction, at least one direction, or in omni-direction, depending on the preference, distance and location of the drone 150. As such, the override signal 116 is configured to be identical to and override the detected drone control signal 151 so as to render the drone's control from its original operator inoperative. Additionally, if the inputted drone control signal 151 is in a higher frequency, the transmission antenna 115 is structured and configured to convert the higher rate of electrical energy in a higher frequency, sufficient for the override signal 116 to gain partial or total control of the detected drone 150. As such, the frequencies transmitted by the transmission antenna 115 can be adjusted and configured relative to the frequencies detected from the drone 150 and the drone control signal 151.

Furthermore, FIG. 1 illustrates an alternate antenna system 170. The alternate antenna system 170 is configured to transmit at least one pulse of 2.4 Ghz energy from the magnetron source. This may be true because the override signal 116 transmitted by the transmission antenna 115 may not be sufficient to effectively override the drone control signal 151 detected. As such, it may also be true that the detected drone is controlled by multiple signals at higher frequencies, which may have rendered the initial override signal 116 aimed at the drone 150 via the transmission antenna 115 to be ineffective. Accordingly, the alternate antenna system 170 can effectively transmit high frequency energy generated from the magnetron source. As such, the magnetron source can be any high power microwave oscillator, in which the potential energy of at least one electron cloud near the cathode is converted into radio frequency energy. Given this, when the magnetron source creates the energy of at least 2.4 Ghz, it is aimed and transmitted in the direction of the drone 150 via the alternate antenna system 170.

Consequently, the alternate antenna system 170 comprises a horn antenna. The horn antenna is configured to amplify and/or transmit at least one pulse of the 2.4 GHz generated by the magnetron source aimed precisely in the direction of the detected drone 150. The horn antenna can be structured as a flaring metal waveguide shaped like a horn to direct the desired high level frequency in the form a beam in the direction of the drone. As such, the horn antenna can be configured to transmit at various frequencies, but preferably at least above 300 MHz. Given this, the horn antenna is structured, dimensioned and configured to have moderate directivity, low standing wave ratio, broad bandwidth, simple construction and adjustable structure. Moreover, the horn antenna is configured to minimize any interruptions such as unwanted signals not in the favored direction of the drone 150 and drone control signal 151, by effectively suppressing them. As such, the horn antenna has no resonant elements and is configured to operate at a wide range of bandwidths.

Figure 2:
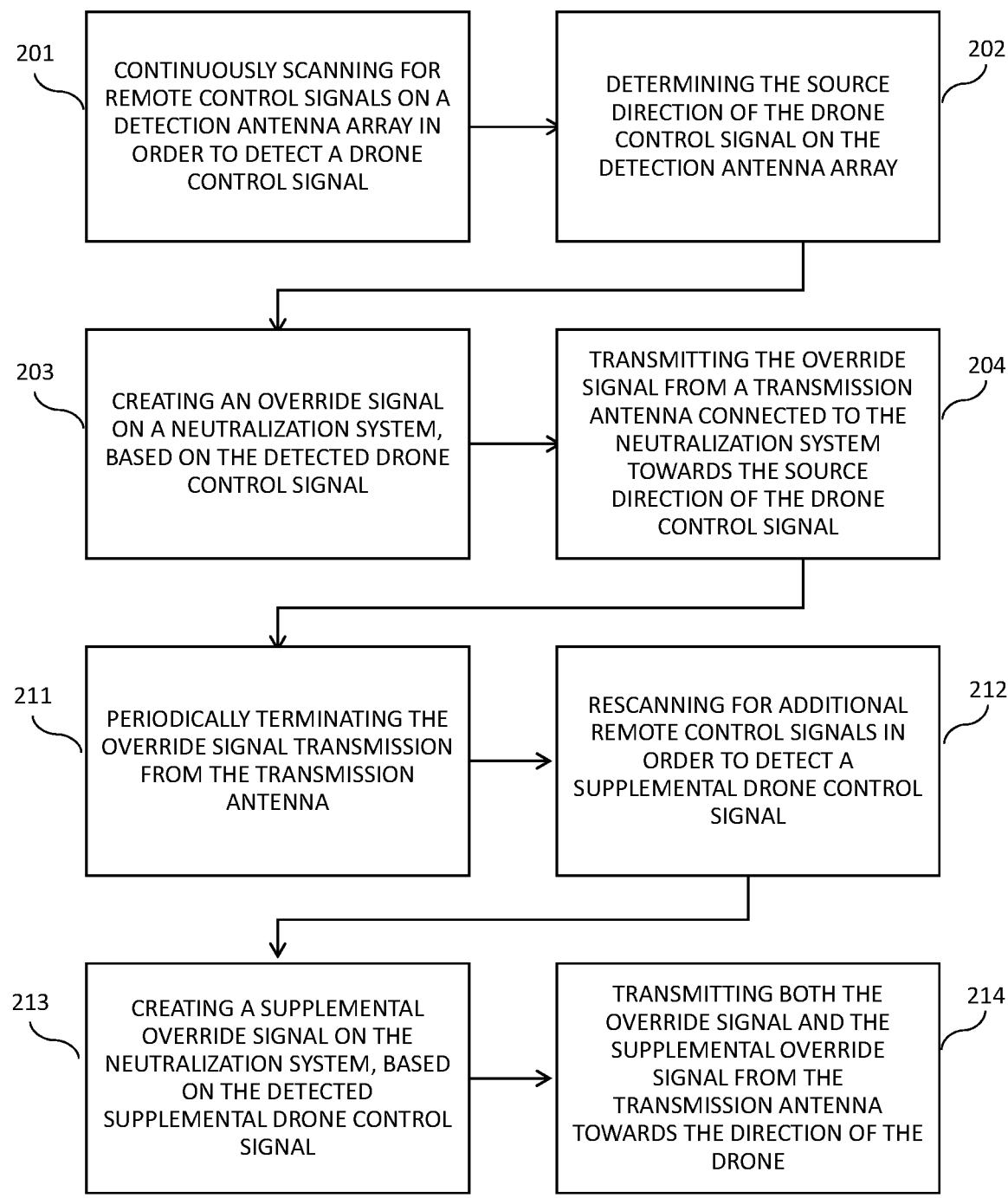
FIG. 2 is a flowchart of a method of the present invention for detecting and defeating a drone.

Looking further, FIG. 2 illustrates a method associated with detecting and defeating a drone 150 according to one of the preferred embodiments. As such, those skilled in the art will appreciate and understand that in step 201, the method comprises of continuously scanning for remote control signals on a detection antenna array 101 in order to detect the drone 150 and the drone control signal 151. To continuously scan, the detection antenna array 101 is configured to detect ISM bands or any other related bands ranging from ultra-low 900 MHz to an extremely high 60 Gigahertz GHz, including, but not limited to the preferable 2.4 GHz ISM band, which is widely recognized as the dominant band for remote controls operating drones 150. Given this, the selection of ISM bands standard can depend on the direction, environment, intended use, and distance of the drone 150 and/or drone control signal 151. Additionally, a display screen indicating the detection and direction of the drone 150 and the drone signal 151 can also be associated in step 201.

Looking again at FIG. 2, in step 202, the source direction of the drone signal 151 on the detection antenna array 101 is determined. The directional determination of the drone signal 151 in step 202 can occur by directing the focus towards one particular direction in which the drone is specifically detected or alternatively, in omni-directionally in search of plurality of drones 150 that may exist in the given range. As such, it will be appreciated by those skilled in the art that the comprehensive signal detecting capabilities of the detection antenna array 101 allows for directional detection and omni-directional detection of drone signal 151 at various frequencies. Moreover, in step 202, the directional antenna array 101 can be configured to measure and determine the frequency hopping intervals, the center frequencies, the modulation types, the frequency spreading factors, and compare any of the detected drone control signal(s) 151 to other standard and non-standard drone control signal 151 protocols stored on hand on a computer and/or a microcontroller system. Accordingly, the directional antenna array 101 can be configured to detect and determine the characteristics of the detected drone control signal 151 by taking into account factors including, but not limited to direction, distance, intensity quality, and external noise interferences. Accordingly, this precise determination by the directional antenna array 101 enables the neutralization system 110 to create an override signal 116. More specifically, once a drone signal 151 is detected and determined by the detection antenna array 101, in step 203, an override signal 116 is created on the neutralization system 110 based on the detected drone signal 151. Consequently, the neutralization system 110 ensures that the override signal 116 created is identical in its specifications to the strongest drone signal 151 detected for a particular drone 150.

Next, in step 204 as referred to in FIG. 2, the override signal 116 is transmitted from the transmission antenna 115 connected to the neutralization system 110, towards the source direction of the drone control signal 151. The override signal 116 transmitted via the transmission antenna 115 is replicated to exact the detected drone signal 151, or alternatively, it is protocol synthesized drone control signal aimed at the direction of the drone 150. The override signal 116 can also be configured to guide the detected drone 150 in case of signal loss or motor shut down. More particularly, the override signal 116 allows for the drone 150 to be safely controlled in the event that the override signal 116 disrupts the drone's 150 existing drone control signal 151. Additionally, the override signal 116 transmitted by the transmission antenna 115 can be configured to suppress any existing drone control signals 151 making it cumbersome for its original operator to maintain control of the drone 150. Consequently, the override signal 116 replaces the drone control signal 151, primarily due to its identical or stronger frequency as the drone control signal 151, relinquishing it from its operative capabilities, thus causing the drone to disconnect from its original operator.

Referring again to FIG. 2, step 211 includes periodically terminating the override signal 116 transmission from the transmission antenna 115. As such, the periodic termination of the drone override signal 116 may occur at various preferred intervals depending on several factors related to the drone 150 and drone control signal 151 detection. More specifically, step 211 provides an alternative, in case the override signal 116 transmitted in step 204 fails to completely override the drone control signal 151. As such, the periodic termination of the override signal 116 transmission helps determine, if there are any existing similar type of remote control signals used. Moreover, it also helps to prevent any confusion in determining the precise existence of plurality of remote control signals, which may have confounded the transmission of the override signal 116 by the transmission antenna 115.

Next, referring again to FIG. 2, in step 212, additional remote control signals are scanned in order to detect supplemental drone control signal 153. This is because there may be other supplemental drone control signals 153 besides the originally detected drone control signal 151 that may be contributing in the control of the detected drone 150. Also, any supplemental drone control signal 153 may also serve as a backup to the primary drone control signal 151 in situations where the original drone control signal 151 may have lost communication with its operator. Accordingly, in step 213, a supplemental override signal 117 is created on the neutralization system 110, based on the detected supplemental drone control signal 153. The supplemental override signal 117 is configured to be identical or stronger in signal strength than the supplemental drone control signal 153. This ensures that any supplemental drone control signal 153 that is contributing secondarily along with the drone control signal 151 or as a backup in the control of the detected drone 150 is also accounted for while defeating the drone 150. Therefore, in one of the preferred embodiments as illustrated in step 214, the override signal 116 and the supplemental override signal 117, both are transmitted from the transmission antenna 115 towards the direction of the drone 150. Alternatively, in other preferred embodiments, the supplemental override signal 117 can be transmitted separately towards the direction of the drone 150 as well.

Figure 3:
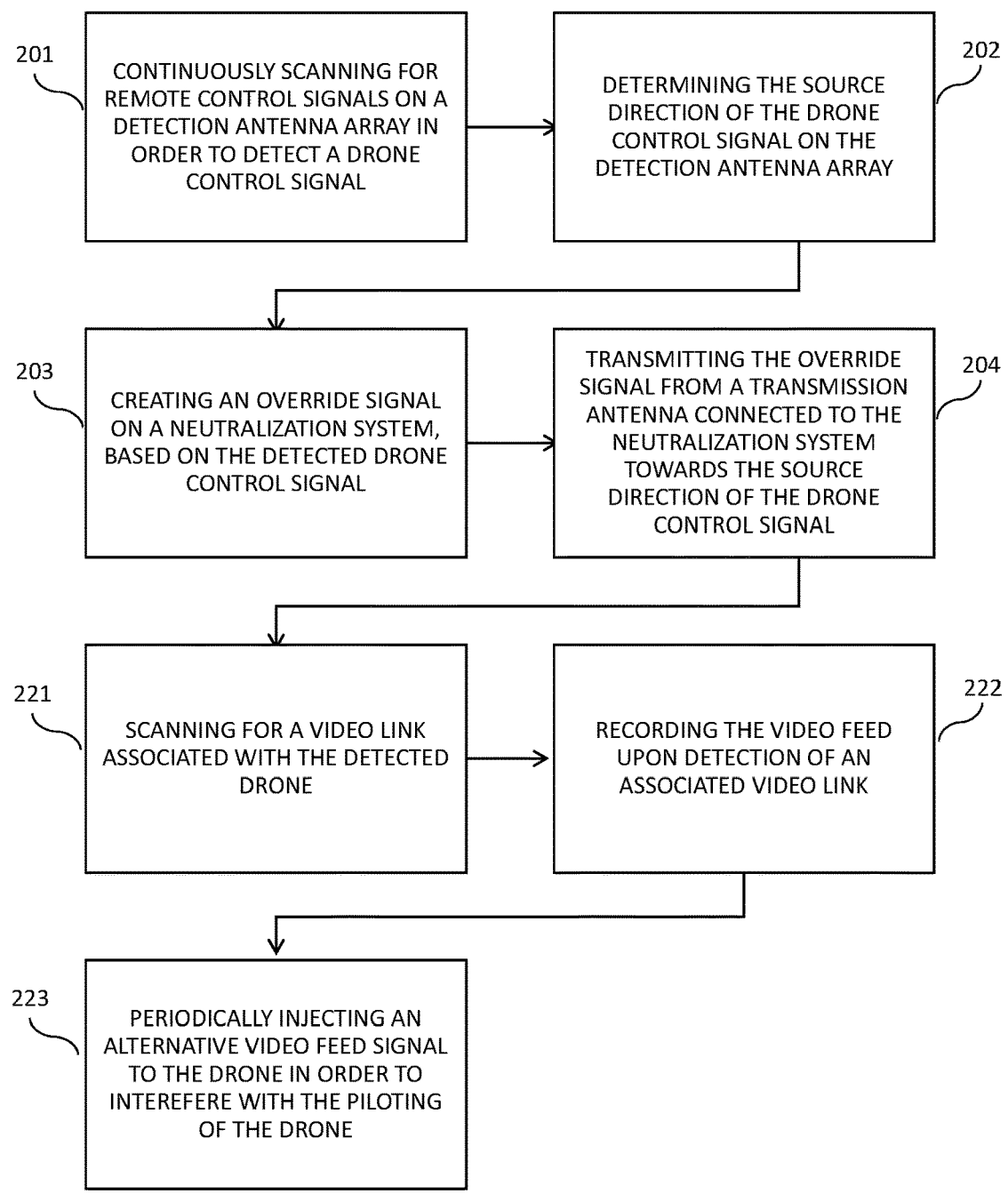
FIG. 3 is a flowchart directed to another method of the present invention for detecting and defeating a drone.

Looking further in one of the other preferred embodiments, FIG. 3 illustrates the method for detecting and defeating the drone 150 according to one of the preferred embodiments. Accordingly, as aforementioned, steps 201 through 204 occur in this preferred embodiment. As such, after step 204 is completed as illustrated, in step 221, once the drone 150 is detected, it is scanned for a video link associated with the detected drone 150. The video link formats may include, but is not limited to .flv, .ogv, .drc, .mng, .avi, .wmv, .yuv, .rm, .rmvb, .asf, .webm, .mp4, .m4p, .mpg, .mpeg, .nsv, .mov, .swf and .3pg. The video link may also be scanned at various frequencies. Accordingly, in the preferred embodiment, the video links associated with the detected drone 150, regardless of the file size, resolution and compatibility can be scanned at any given frequency. Given this, it will be appreciated by those skilled in the art that in one of the preferred embodiments, the video link associated with the detected drone 150 can be scanned on the 5.8 GHz ISM band. Additionally, in at least one preferred embodiment, the video link associated with the detected drone 150 can also be scanned on a 915 MHz ISM band. As such, the ISM bands also allow for the video link of any aerial footage captured in real time by the detected drone 150 to be sent back to the neutralization system 110 to be recorded for display. To accomplish this, any electronic display equipment can be used to view the recorded footage captured by the drone 150. The recorded footage can be used for real time feedback of drone 150 behavior and other telemetry data which will be explained in greater detail below.

Looking further in one of the preferred embodiments, the video file can include formats containing video data in various coding formats, alongside with audio data in various audio coding formats. As such, the video formats can include any type of synchronization information, subtitles, and metadata associated with the video link. So, once the video link is scanned and detected, the video feed associated with the video link is recorded. Once the video is successfully recorded, in step 223, an alternate video feed signal to the drone 150 is periodically injected, in order to interfere with the piloting of the drone 150. More specifically, real time feedback of drone behavior and other related telemetry data, including but not limited to GPS positions, battery voltage, images of drone operation and precise location of its operator is recorded. Once recorded, the image data is readily analyzed to be used as a vantage point to determine how the control of the drone 150 will be precisely negotiated. As such, in one of the preferred embodiments, an alternate video feed signal to the drone 150 is periodically injected in order to confuse, interfere and incapacitate the piloting of the drone from its original operator. More particularly, the alternate video feed signal periodically injected in step 223, can be configured to repeat the video footage already recorded by the drone in a repeated, looped time frame format, so as to trick its operator in believing that he/she still has control of the drone and temporarily avoid any suspicion of hostile takeover of controls of the drone 150.

Figure 4:
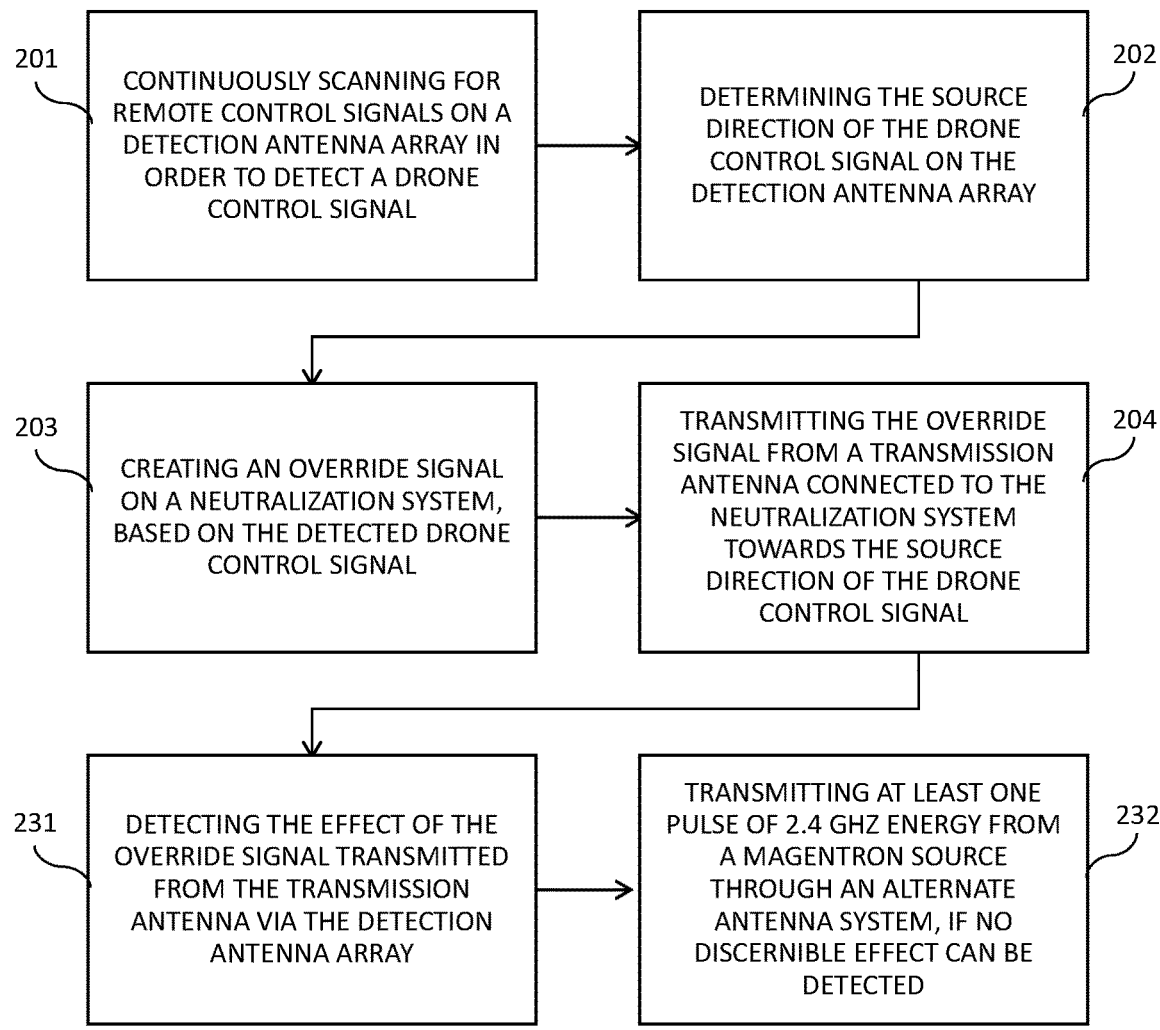
FIG. 4 is a flowchart directed to another method of the present invention for detecting and defeating a drone.

Looking further, FIG. 4 explains the method for detecting and defeating the drone 150 according to at least one preferred embodiment. Accordingly, in this preferred embodiment, steps 201 through 204 are completed as aforementioned earlier. Given this, after step 204, in step 231, the detection antenna array 101 detects the effect of the override signal 116 transmitted from the transmission antenna 115 on the drone 150. More specifically, the detection antenna array 101 detects whether the override signal 116 transmitted in the direction of the drone 150 is effectively able to override the drone control signal 151, so as to render the drone 150 uncontrollable from its original operator. As such, in one of the preferred embodiments, if the effect of the override signal 116 is operative on the drone 150, then measures pertaining to total control and capture of the drone 150 can be proceeded, and no other alternate signals of higher frequency may be transmitted. However, if the effect of the override signal 116 is inoperative on the drone 150, then in one of the preferred embodiments, stronger frequency based override signals 116 may be transmitted. More particularly, once the override signal 116 is detected to be inoperative in terms of overriding the existing drone control signal 151 in terms of effectuating partial or total control of the drone 150, then step 232 as described in greater detail below will be commenced.

Accordingly, referring to FIG. 4 again, in step 232, if no discernible effect can be detected, at least one pulse of 2.4 GHz energy from a magnetron source (not shown) through an alternate antenna system 170 is transmitted. This is because some of the remote control signals can operate at a frequency of 2.4 GHz, the same frequency standard at which most Wi-Fi standards 802.11g, 802.11n, IEEE 802.15.4 based wireless data networks, and Bluetooth devices operate on nowadays. Given this, the 2.4 GHz pulse of energy is transmitted via the alternate antenna system 170 aimed in the direction of the drone 150. As such, the alternate antenna system 170 can comprise a horn antenna. The horn antenna is configured to receive at least one pulse of 2.4 GHz energy from a magnetron source. Furthermore, the horn antenna, which has a far field pattern, is also configured to transmit this energy in a beamed format aimed towards the drone 150. Given this, the horn antenna of the alternate antenna system 160 can provide a higher power handling and lower insertion loss transition for the 2.4 GHz energy coupled out of the magnetron source. The magnetron source offers high energy conversion efficiency and can be configured to reduce the risk of interference by shifting the magnetron source's resonant frequency in a more desirable frequency spectrum conducive to conditions for drone control. Given all of this, if no apparent effect is detected when the initial override signal 116 in step 231 is transmitted, the horn antenna of the alternate antenna system 170 transmits at least one pulse of 2.4 GHz energy aimed towards or approximately near the drone 150, sufficient to gain control of the drone 150. Alternatively, in one of the preferred embodiments, at least one pulse of 2.4 Gigahertz GHz energy from a magnetron source can also be transmitted via the horn antenna of the alternate antenna system 170 in situations where alternate, manipulated video feed signals are required to be injected periodically in the 2.4 GHz frequency range towards the drone so as to confuse its operator and make operation of the drone cumbersome.

Figure 5:
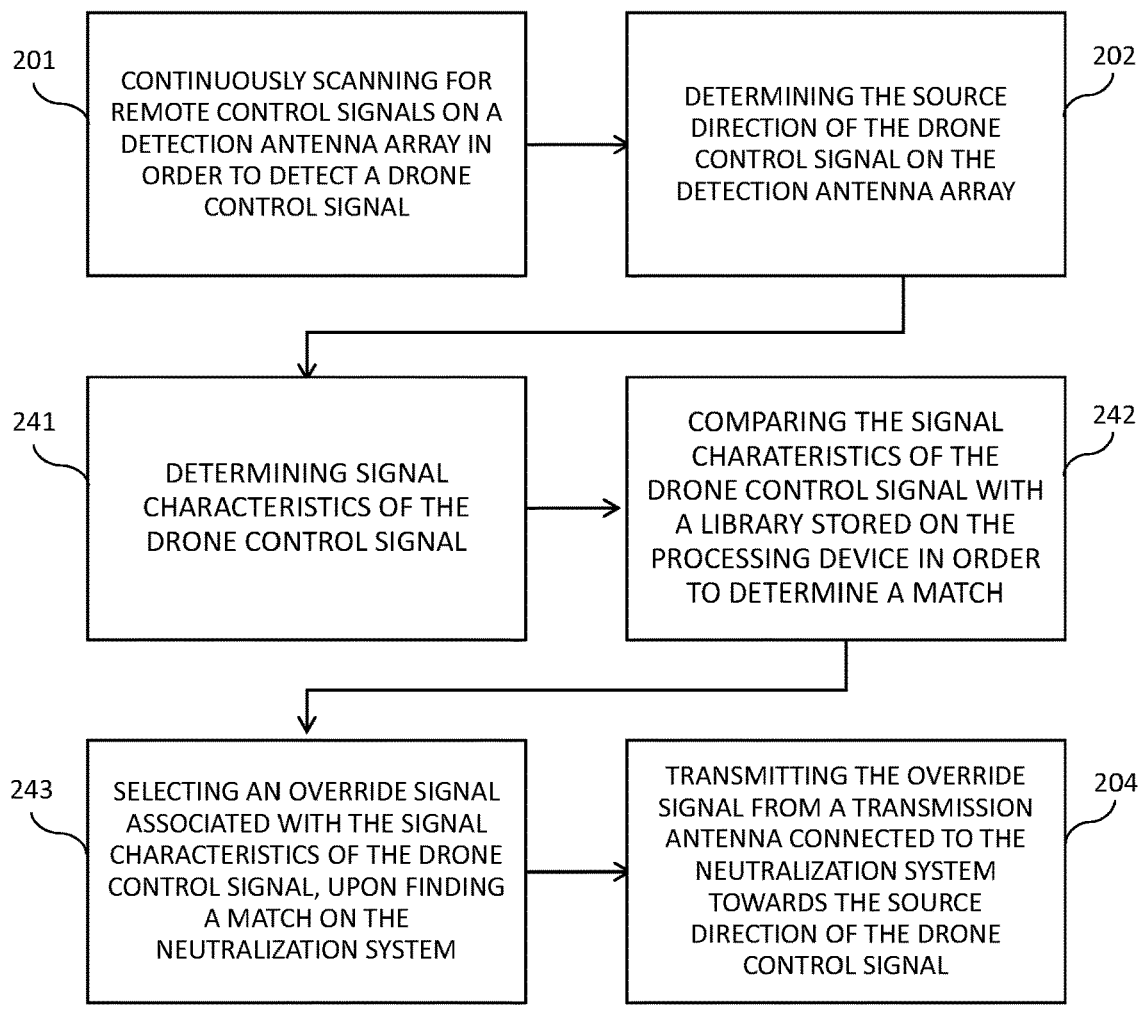
FIG. 5 is a flowchart directed to another method of the present invention for detecting and defeating a drone.

Looking further, FIG. 5 illustrates at least one of the preferred embodiments, in which steps 201 and 202 are completed as aforementioned earlier. Accordingly, in step 241, the signal characteristics of the drone control signal 151 are determined. More specifically, the signal characteristics may comprise determining the frequency hopping interval of the drone control signal 151, determining the center frequency of the drone control signal 151, determining the modulation type of the drone control signal 151 and determining the frequency spread of the drone control signal 151.

Accordingly, once the drone control signal is detected by the detection antenna array 10, in step 241, the processing device 111 receives the data and determines the characteristics of the drone control signal 151, including but not limited to at least one factor such as frequency levels, center frequencies, modulation types, and frequency spreading factors. After making a precise determination, the drone control signal 150 characteristics are then compared against to the various data stored in the processing device 111. More specifically, as illustrated in step 242, the signal characteristics of the drone control signal 151 are compared with a library stored on the processing device 111 in order to determine a match. The library saved on the processing device 111 is highly comprehensive and can comprise a wide spectrum of frequencies data including, but not limited to ultra-low 900 MHz to the new extremely high 60 GHz. The library may also contain other relevant information on various standard and non-standard center frequencies, bandwidths, modulations and other remote control signal protocols. Essentially, the library stored on the processing device 111 comprises all the relevant information, sufficient to determine a precise counterpart, so that an identically matched override signal 116 can be created in the system 100. Given this, and referring to FIG. 5 again, in step 243, an override signal 116 is selected. The selected signal 116 is closely associated, if not identical, to the signal characteristics of the detected drone control signal 151. As such, the signal characteristics may comprise determining the frequency hopping interval of the drone control signal 151, determining the center frequency of the drone control signal 151, determining the modulation type of the drone control signal 151 and determining the frequency spread of the drone control signal 151. Given this, the override signal 116 is precisely selected based on its closely matched signal characteristics to the drone control signal 151, accomplished by thoroughly comparing and analyzing against all the relevant signal based data stored in the library of the processing device 111 on the neutralization system 110.

Accordingly and referring to FIG. 5 yet again, in step 204, the override signal 116 is transmitted from the transmission antenna 115 connected to the neutralization system 110 towards the source direction of the drone control signal 151. As aforementioned earlier, the override signal 116 transmitted via the transmission antenna 115 is replicated to match the detected drone signal 151, or alternatively, it is protocol synthesized drone control signal aimed at the direction of the drone 150. Given this, in one of the preferred embodiments, the override signal 116 is configured to guide the detected drone 150 in case of signal loss or motor shut down. More particularly, the override signal 116 allows for the drone 150 to be safely controlled in the event that the override signal 116 disrupts the drone's 150 existing drone control signal 151. Additionally, the override signal 116 transmitted by the transmission antenna 115 can be configured to suppress any existing drone control signals 151 making it extremely cumbersome for its original operator to maintain control of the drone 150. As such, the override signal 116 in time overpowers the drone control signal 151, thus relinquishing any and all control from its original operator by rendering it inoperable. Furthermore, the override signal 116 is configured to allow the renewed control of the drone 150 to safely capture and land the drone 150. This means that the override signal 116 ensures that the new control of the drone 150 does not physically damage the drone 150. As such, a series of override signals 116 can be continuously sent aimed at the drone 150, so that a successful capture and landing of the drone 150 is resulted. Furthermore, to supplement this successful capture, frequencies related to the drone's video links are also continuously relayed back and forth in order get the visual data sufficient to view real time capture and landing of the drone 150.

Any of the above methods may be completed in sequential order in at least one preferred embodiment, though they may be completed in any other order in other preferred embodiments. In at least one of the preferred embodiments, the above methods may be exclusively performed, but in other preferred embodiments, one or more steps of the methods as described may be skipped.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A system for detecting and defeating a drone comprising:
    at least one detection antenna configured to detect a control signal of the drone within a 360 degree field relative to said at least one detection antenna;
    said detection antenna further structured to detect a video link of the drone,
    a neutralization system disposed in communication with said at least one detection antenna;
    said neutralization system including,
    at least one transmission antenna configured to transmit an override signal to the detected drone, and
    a processing device configured to generate said override signal and control transmission of said override signal
    said processing device further structured to record a video feed upon detection of said associated video link.

2. The system as recited in claim 1 wherein said at least one detection antenna comprises a 90 degree sector antenna.

3. The system as recited in claim 1 wherein said override signal comprises a replication of the drone control signal.

4. The system as recited in claim 3 wherein said processing device comprises a software defined radio.

5. The system as recited in claim 1 wherein said override signal comprises a header of the drone control signal.

6. The system as recited in claim 5 wherein said override signal further comprises an injected control code.

7. The system as recited in claim 6 wherein said override signal further comprises random noise.

8. The system as recited in claim 1 wherein said processing device is further configured to monitor for an effect of said override signal and cause the transmission of at least one pulse of 2.4 GHz energy from a magnetron source through an alternate antenna system, if no discernible effect can be detected.

9. A method for detecting and defeating a drone comprising:
    utilizing at least one detection antenna to detect at least one drone control signal of the drone;
    utilizing a neutralization system to identify at least one signal characteristic of the at least one drone control signal;
    utilizing the neutralization system to generate an override signal, the override signal at least partially generated with reference to the at least one drone control signal; and,
    utilizing at least one transmission antenna to transmit the override signal to the detected drone,
    utilizing said at least one detection antenna to determine a source direction of the drone with reference to the at least one drone control signal,
    periodically terminating the override signal transmission from the at least one transmission antenna, rescanning for additional drone control signals in order to detect a supplemental drone control signal of the drone,
    creating a supplemental override signal on the neutralization system, based on the detected supplemental drone control signal, and
    transmitting both the override signal and the supplemental override signal from the transmission antenna towards the direction of the drone.

10. The method as recited in claim 9 further comprising recording a video feed upon detection of an associated video link.

11. The method as recited in claim 9 further comprising transmitting an alternative video feed signal to the drone.

12. A method for detecting and defeating a drone comprising:
- scanning for remote control signals with at least one detection antenna in order to detect at least one drone control signal;
- determining at least one signal characteristic of the drone control signal;
- comparing the at least one signal characteristic with a library stored on a neutralization system;
- selecting an override signal at least partially associated with the at least one signal characteristic; and,
- transmitting said override signal from at least one transmission antenna connected to the neutralization system,
- recording a video feed upon detection of an associated video link.

13. The method as recited in claim 12 further comprising determining a source direction of the drone with the at least one detection antenna with reference to the most dominant of the at least one drone control signal received by the at least one detection antenna.

14. The method as recited in claim 12 wherein said signal characteristics comprise determining a frequency hopping interval of the drone control signal.

15. The method as recited in claim 12 wherein said signal characteristics comprise determining a center frequency of the drone control signal.

16. The method as recited in claim 12 wherein said signal characteristics comprise determining the modulation type of the drone control signal.

17. The method as recited in claim 12 wherein said signal characteristics comprise determining a frequency spread of the drone control signal.

18. A method for detecting and defeating a drone comprising:
- utilizing at least one detection antenna to detect at least one drone control signal of the drone;
- utilizing a neutralization system to identify at least one signal characteristic of the at least one drone control signal;
- utilizing the neutralization system to generate an override signal, the override signal at least partially generated with reference to the at least one drone control signal; and,
- utilizing at least one transmission antenna to transmit the override signal to the detected drone,
- utilizing said at least one detection antenna to determine a source direction of the drone with reference to the at least one drone control signal, and
- recording a video feed upon detection of an associated video link.

* * * * *